US011521223B2

(12) United States Patent
Jacobs et al.

(10) Patent No.: US 11,521,223 B2
(45) Date of Patent: Dec. 6, 2022

(54) AUTOMATED FABRICATION PRICE QUOTING AND FABRICATION ORDERING FOR COMPUTER-MODELED STRUCTURES

(71) Applicant: Protolabs, Inc., Maple Plain, MN (US)

(72) Inventors: James L Jacobs, Rye Beach, NH (US); Steven M Lynch, Hudson, NH (US)

(73) Assignee: Protolabs, Inc., Maple Plain, MN (US)

( * ) Notice: Subject to any disclaimer, the term of this patent is extended or adjusted under 35 U.S.C. 154(b) by 0 days.

(21) Appl. No.: 17/150,173

(22) Filed: Jan. 15, 2021

(65) Prior Publication Data

US 2021/0133788 A1 May 6, 2021

Related U.S. Application Data

(63) Continuation-in-part of application No. 14/060,033, filed on Oct. 22, 2013.

(60) Provisional application No. 61/717,185, filed on Oct. 23, 2012.

(51) Int. Cl.
| | |
|---|---|
| *G06Q 30/02* | (2012.01) |
| *G06F 30/13* | (2020.01) |
| *G06F 30/00* | (2020.01) |
| *G06F 111/02* | (2020.01) |

(52) U.S. Cl.
CPC ......... *G06Q 30/0206* (2013.01); *G06F 30/13* (2020.01); *G06F 2111/02* (2020.01)

(58) Field of Classification Search
CPC ........... G06Q 30/0206; G06Q 10/0637; G06Q 30/0611; G06F 30/13; G06F 2111/02
USPC .................................................. 705/26, 26.4
See application file for complete search history.

(56) References Cited

U.S. PATENT DOCUMENTS

| 5,117,354 | A | * | 5/1992 | Long ................. G06Q 30/0617 705/26.62 |
|---|---|---|---|---|
| 6,112,133 | A | | 8/2000 | Fishman |
| 6,917,847 | B2 | | 7/2005 | Littlejohn et al. |
| 7,058,465 | B2 | | 6/2006 | Emori et al. |
| 7,299,101 | B2 | | 11/2007 | Lukis et al. |

(Continued)

FOREIGN PATENT DOCUMENTS

WO 20111440646 A1 11/2011

OTHER PUBLICATIONS

International Search Report; /PCT/US2021/018335; dated: Apr. 28, 2021; By: Authorized Officer Bline R. Copenheaver.

*Primary Examiner* — Garcia Ade
(74) *Attorney, Agent, or Firm* — Caldwell Intellectual Property Law

(57) ABSTRACT

A system that provides automated/semi-automated price quotations for fabricating one or more instantiations of a structure that is modeled in a computer model. The system automatedly extracts price-influencing data from the computer model. The system uses the extracted pricing data and pricing parameters to automatedly determine a firm fabrication-price quotation. In some embodiments, the system further includes fabrication ordering functionality that allows a user place a fabrication order with a fabricator based on the firm price quotation. Such systems can be implemented in any of a wide variety of manners, such as within a single computing device or across a communications network, among others. In some embodiments, functionalities of the system are integrated into computer-modeling software directly of via add-on software.

19 Claims, 24 Drawing Sheets

(56) References Cited

U.S. PATENT DOCUMENTS

| | | |
|---|---|---|
| 7,305,367 B1 | 12/2007 | Hollis et al. |
| 7,343,212 B1 | 3/2008 | Brearley et al. |
| 7,359,886 B2 | 4/2008 | Sakurai et al. |
| 7,369,970 B2 | 5/2008 | Shimizu et al. |
| 7,565,223 B2 | 7/2009 | Moldenhauer et al. |
| 7,567,849 B1 | 7/2009 | Trammell et al. |
| 7,603,191 B2 * | 10/2009 | Gross ............... G06F 30/00 705/400 |
| 7,979,313 B1 | 7/2011 | Baar |
| 8,175,933 B2 | 5/2012 | Cook, Jr. et al. |
| 8,271,118 B2 | 9/2012 | Pietsch et al. |
| 2005/0273401 A1 | 12/2005 | Yeh et al. |
| 2007/0073593 A1 | 5/2007 | Perry et al. |
| 2007/0112635 A1 | 5/2007 | Loncaric |
| 2012/0316667 A1 | 12/2012 | Hartloff |
| 2019/0213653 A1 | 7/2019 | Herrman et al. |
| 2020/0134681 A1 | 4/2020 | Jacobs, II |
| 2020/0349303 A1 | 11/2020 | Burton |

\* cited by examiner

User information

Registered user information

Registered user e-mail*
slynch@rapidsheetmetal.com

First name*: Steve
Last name*: Lynch
Company*: Rapid Sheet Metal
Phone#*: 603 - 821 - 5300   Ext

Shipping information

Shipping attn: to

First name: Steve
Last name: Lynch
Company: Rapid Sheet Metal
Address 1: 104 Perimiter Rd
Address 2:
City: Nashua
State: NH   Zip code: 03051
Phone#: 603 - 821 - 5300   Ext

FIG. 8

RAPID
*SHEET METAL INC* 24 Hour Quotes • 48 Hour Expedites • 1-2 Week Standard Ship • ITAR Registered
Rapid Prototype Sheet Metal Get a RapidQuote
Quick Turn Services
Why Rapid Sheet Metal?
ITAR Services
Rapid Machining
Rapid Wire Cable
Rapid Stampings
Rapid Products
Rapid Tooling Library
Rapid Tech Tips
Resource Links
Contact Us
Home

VISA

Welcome to SolidQuote
Quotes in Seconds. Parts in Days.
Home → SolidQuote — 1704

1708 —
Download — 1712
Support
FAQ

1716 —
Rapid Tooling
Supported Finishes — 1720
Converting To Sheet Metal — 1724

👍 Like  35 Likes. Sign Up to see what your friends like.

Rapid Sheet Metal Prototypes...
.... As Fast as Your SLA Models

FIG. 17

RAPID SHEET METAL INC

Rapid Prototype Sheet Metal
24 Hour Quotes • 48 Hour Expedites • 1-2 Week Standard Ship • ITAR Registered SolidOrder Enter your user name and password below.

User Name ──1904

Password ──1908

☐ Remember Me?

[Login] ──1912

FIG. 19

*RAPID* SHEET METAL INC

Rapid Prototype Sheet Metal
24 Hour Quotes • 48 Hour Expedites • 1-2 Week Standard Ship • ITAR Registered    [Log Out]

SolidOrder

| Quote Date | Total Price | |
|---|---|---|
| 8/13/2012 5:33:58 PM | $351.00 | ☐ |
| 8/13/2012 5:18:18 PM | $880.00 ☐ | |

2004 →
2008 →

Order Summary

Billing address:

Billing information:

Shipping Information:

RAPID SHEET METAL INC

Rapid Prototype Sheet Metal [Log Out]

24 Hour Quotes • 48 Hour Expedites • 1-2 Week Standard Ship • ITAR Registered

SolidOrder

Order Summary

Choose your shipping speed:     Choose your shipping carrier:     Freight Terms:
- ○ Standard Shipping-Ships Wednesday, 22    UPS     PrePay & Add
- ◉ Expedited
  - ○ 25% - Ships Monday, 20    FedEx
  - ○ 50% - Ships Friday, 17
  - ○ 75% - Ships Thursday, 16  } 2200
  - ○ 100% - Ships Wednesday, 15

Billing address:

Billing information:

| Part Description | Qty | Price Each | Ext. Price | Preview |
|---|---|---|---|---|
| ---- | 1 | $351.00 | $351.00 | ◇ |

Shipping Information:

Choose your shipping speed:
Standard Shipping-Ships Friday, 24
Expedited

There is no data to display

FIG. 22

AUTOMATED FABRICATION PRICE QUOTING AND FABRICATION ORDERING FOR COMPUTER-MODELED STRUCTURES

CROSS-REFERENCE TO RELATED APPLICATIONS

This application is a continuation in part of U.S. Nonprovisional application Ser. No. 14/060,033 filed on Oct. 22, 2013, and entitled, "AUTOMATED FABRICATION PRICE QUOTING AND FABRICATION ORDERING FOR COMPUTER-MODELED STRUCTURES", which claims the benefit of priority of U.S. Provisional Patent Application Ser. No. 61/717,185, filed on Oct. 23, 2012, and titled "SYSTEM AND METHOD FOR GENERATING QUOTES AND ORDERING PARTS," which is incorporated by reference herein in its entirety.

FIELD OF THE INVENTION

The present invention generally relates to the field of computer-aided design and structure fabrication. In particular, the present invention is directed to automated fabrication price quoting and fabrication ordering of computer-modeled structures.

BACKGROUND

Technical specifications and engineering drawings typically convey a variety of information about a to-be-fabricated structure, such as a part or an assembly of components. Examples of such information includes information about geometry, materials, finishes, connections, hardware, special processes, dimensions, tolerances, and others things as known in the art. The documents are prepared by engineers; however, manufacturers rely on the documents for manufacturing preparation to build the desired structure, such as a part or an assembly of multiple components. There are differing skill levels involved on both the engineering side and the manufacturing side, which has led to a gap between the two stages involved in fabricating a structure.

Various changes in engineering and manufacturing have generally driven fabrication cost estimates to be created from the hardcopies of the documents, which causes several problems and disadvantages. As an initial matter, each estimator, i.e., the person developing a price quote for a particular part or assembly, will often interpret the information in the hardcopies differently due to their level of experience and/or other factors. Thus, using hardcopies, it can be extremely difficult, if not impossible, to maintain consistent pricing. Additionally, human reviewers can overlook key features on the hardcopies such that they are not included in the finished part and/or assembly. There is also often a lengthy time period required for quoting prototypes. All of the required documents may not be available using the hardcopy approach, and fabricators can be forced to use only the information that the engineers supply, which may be incomplete. If additional information is needed, further communication between the estimator and the engineer is required. Additionally, human interaction is required, which leads to errors and discrepancies between analyses performed by different people.

Also disadvantageously, using a hardcopy approach, preparing the paperwork for information not related to the drawings is often more time-consuming than designing the structure itself. Advanced calculations are needed to determine various information, such as, a perimeter length, flat area, holes sizes, flat size, sheet usage, etc., needed to create a cost estimate when employing hardcopies. Furthermore, missing information can typically only be obtained by contacting an engineer, which is time consuming and inefficient.

SUMMARY OF THE DISCLOSURE

In one implementation, the present disclosure is directed to a method of providing, to a user on a user computer, a firm fabrication-price quote for fabricating one or more instantiations of a structure represented in a computer model viewable on computer-modeling software, the method being executed by a price-quoting system. The method includes providing a price-quoting user interface to the user on the user computer, wherein the price-quoting user interface is integrated with the computer-modeling software; extracting, via the computer-modeling software, pricing data from the computer model so as to provide extracted pricing data; receiving, via the price-quoting user interface, non-extracted pricing data corresponding to the structure; correlating at least one of 1) the extracted pricing data and 2) the non-extracted pricing data to a set of actual fabrication resource requirements needed for fabrication; determining the firm fabrication-price quote as a function of the extracted pricing data, the non-extracted pricing data, and pricing parameter data; and displaying the firm fabrication-price quote to the user via the price-quoting user interface.

In another implementation, the present disclosure is directed to a machine-readable gears, bolts, threads, etc. storage medium containing machine executable instructions for performing a method of providing, to a user on a user computer, a firm fabrication-price quote for fabricating one or more instantiations of a structure represented in a computer model viewable on computer-modeling software, said machine-executable instructions designed and configured to be executed by a price-quoting system. The machine-executable instructions include a first set of machine-executable instructions for providing a price-quoting user interface to the user on the user computer, wherein the price-quoting user interface is integrated with the computer-modeling software; a second set of machine-executable instructions for extracting, via the computer-modeling software, pricing data from the computer model so as to provide extracted pricing data; a third set of machine-executable instructions for receiving, via the price-quoting user interface, non-extracted pricing data corresponding to the structure; a fourth set of machine-executable instructions for correlating at least one of 1) the extracted pricing data and 2) the non-extracted pricing data to a set of actual fabrication resource requirements needed for fabrication; a fifth set of machine-executable instructions for determining the firm fabrication-price quote as a function of the extracted pricing data, the non-extracted pricing data, and pricing parameter data; and a sixth set of machine-executable instructions for displaying the firm fabrication-price quote to the user via the price-quoting user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein:

FIG. 8 is a screenshot of a log-in display window of a particular instantiation of the fabrication-price-quoting- and ordering-system of FIG. 3;

FIG. 17 is a screenshot of a webpage of a website containing learning tools that are accessible from the fabrication-price-quoting- and ordering-system of FIG. 3;

FIG. 19 is a screenshot of a log-in display window of a customer portal of the fabrication-price-quoting- and ordering-system of FIG. 3;

FIG. 20 is a screenshot of a display window of the customer portal of FIG. 19, showing price quotes generated for the logged-in customer;

FIG. 21 is a screenshot of a display window of the customer portal of FIG. 19, after one of the price quotes has been selected;

FIG. 22 is a screenshot of a display window of the customer portal of FIG. 19, showing shipping options;

Figure 1:
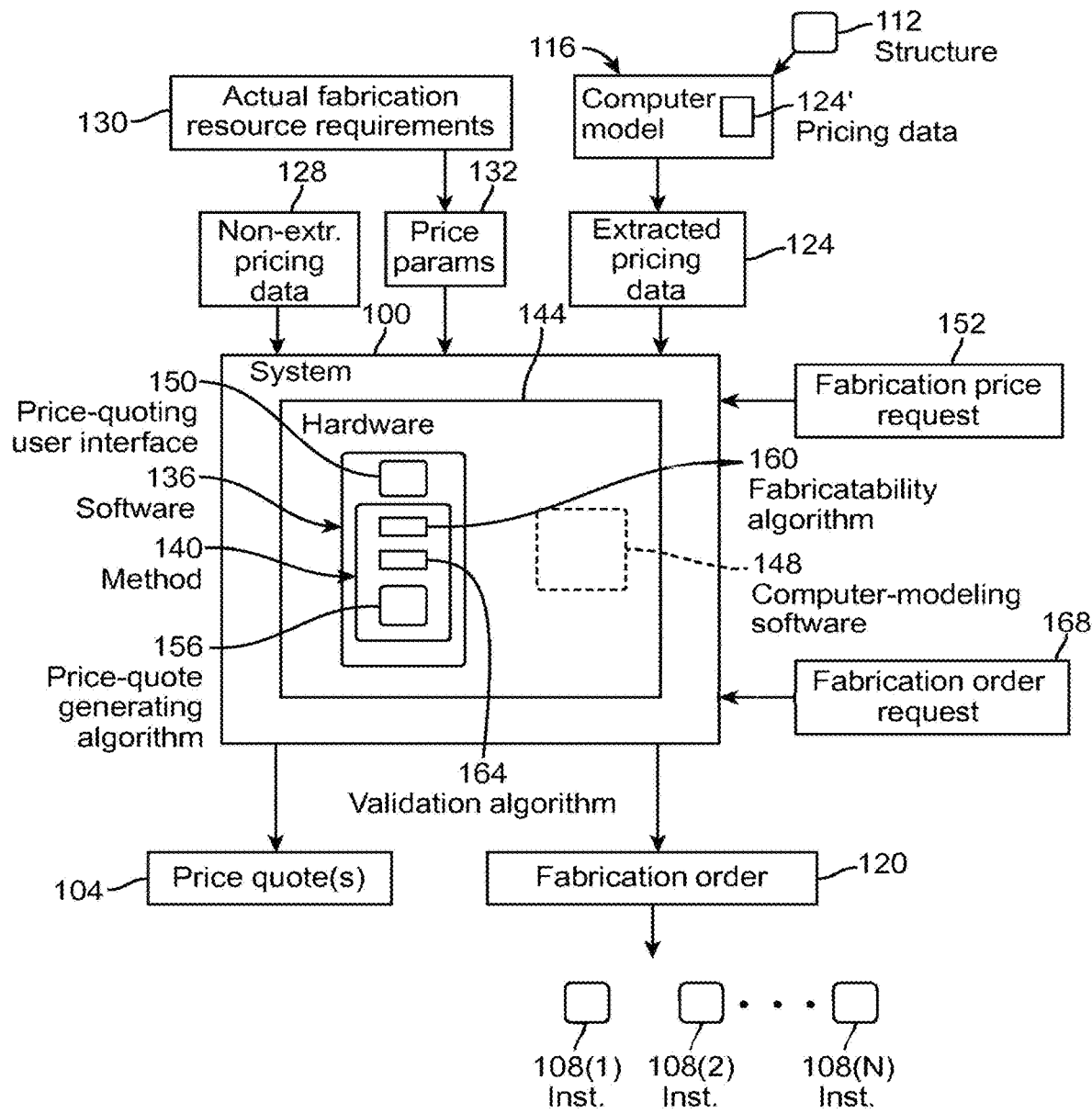
FIG. 1 is a high-level block diagram of a fabrication-price-quoting- and-ordering system made in accordance with the present disclosure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Aspects of the present invention include software tools and techniques for automatedly generating one or more price quotations for fabricating one or more instantiations of a structure that is represented in a computer model. Using various ones of these tools and techniques, precise geometries and other pricing data extracted from the computer model can be used along with appropriate non-extracted pricing data and pricing parameters from a particular fabricator to create highly precise and highly repeatable fabrication-price quotes, which are firm quotes upon which a user can place a fabrication order with the fabricator. Other aspects of the present invention include software tools and techniques for allowing a user to place an order for fabricating one or more instantiations of a computer modeled structure, such as in conjunction with the generating of the price quotation. Still other aspects of the present invention include systems for generating such price quotes and permitting such ordering. These and other aspects of the present invention will become readily apparent upon reviewing this entire disclosure. Before proceeding with describing the numerous aspects of the present invention in detail, a number of definitions of certain terms used throughout this disclosure, including the appended claims, are first presented. These terms shall have the following meanings throughout unless noted otherwise. Like terms, such as differing parts of speech, differing tenses, singulars, plurals, etc., for the same term (e.g., fabricating, fabricate, fabrication, fabrications, fabricated) shall have commensurate meanings.

Structure: A "structure" can be any physical thing that can be made by or under the control of a human and/or under the control of one or more machines. For example, a "structure" can be made by hand, using one or more tools, using one or more pieces of machinery, or any combination thereof. Examples of structures include, but are not limited to objects, parts, assemblies of components, buildings, vehicles, machines, semiconductor devices, computing devices, and electronic equipment, among many others. Fundamentally, there is no limitation on what a "structure" can be other than that it is fabricated.

Fabricate: To "fabricate" a structure is perform a step or collection of steps needed to physically instantiate the structure. In this context, fabrication includes, but is not limited to steps of cutting, machining, milling, turning, making connections, molding, in particular injection molded parts, casting, stamping, forming, bending, depositing, etching, drilling, extruding, sintering, etc. Synonyms that fall within the meaning of "fabricate" herein include, but are not limited to manufacture, erect, assemble, mold, and form, among many others.

Computer Model: A "computer model" is a virtual, for example, digital, model of a physical structure as created using appropriate computer-modeling software, such as SOLIDWORKS® software (available from Dassault Systèmes SolidWorks Corp, Waltham, Mass.), AUTOCAD® software (available from Autodesk, Inc., San Rafael, Calif.), and MICROSTATION® software (available from Bentley Systems, Inc., Exton, Pa.), among many others. A "computer model" can be of any type, such as a wireframe or solid model, among others, or any combination thereof, and can be saved in a computer file using any suitable file protocol, such as .SLDPRT, .SLDASM, .STP, and .IGS, among others. A "computer model" includes information about the geometry and/or other properties of the modeled structure.

Extracted Pricing Data: "Extracted pricing data" are input data to a system of the present disclosure that are extracted from a computer model and that influence the cost of fabricating one or more instantiations of the structure represented by the computer model. It is noted that while the term "extracted" is used herein, the process of obtaining pricing data from a computer model is more one of scraping than extraction, because the pricing data is not removed from the computer model (which would destroy its integrity) but rather scraped, i.e., copied from the computer model and processed as needed for use in the system. Examples of "extracted pricing data" include, but are not limited to, geometry (such as size, shape, dimensions, areas, configurations, numbers of components and other features, such as openings, recesses, bosses, etc.), type(s) of material (in computer models wherein materials can be specified), connection type(s) and features (in computer models wherein such information can be specified), finish type(s) (in computer models wherein finishes can be specified), and purchased or otherwise pre-fabricated parts (e.g., hardware) and subassemblies (e.g., hinges), among many others. Fundamentally, there is no limitation on the data that can constitute "extracted pricing data," other than that they are present in a computer model and extractable therefrom and that they influence the cost of fabrication and, therefore, a firm fabrication-price quote.

Non-Extracted Pricing Data: "Non-extracted pricing data" are input data to a system of the present disclosure, other than extracted pricing data, required from a user or other source in order to generate a price quote. Examples of "non-extracted pricing data" include, but are not limited to, number of instantiation desired to be fabricated, required delivery date(s), type of delivery, type(s) of material (in computer models wherein materials cannot be specified), connection type(s) and features (in computer models wherein such information cannot be specified), finish type(s) (in computer models wherein finishes cannot be specified), among others. "Non-extracted pricing data" can be input or received in any suitable manner, such as via a user-input interface or a non-computer-model electronic document, such as a form-fillable portable document format (PDF) document, or a non-computer-model data file, among others. Fundamentally, there is no limitation on the data that can constitute "non-extracting pricing data," other than that they are not extracted from a computer model, and that they influence the cost of fabrication and, therefore, a firm fabrication-price quote.

Pricing Parameters: "Pricing parameters" are parameters that are applied to extracted and non-extracted pricing data and that otherwise affect the cost of fabricating one or more instantiations of the structure represented in a computer model and, therefore, affect a firm fabrication-price quote. "Pricing parameters" are pricing parameters from a particular fabricator with which, if the user accepts the firm price quote(s), places a fabrication order. Examples of "pricing parameters" include, but are not limited to, material costs, fabrication costs, assembly costs, tooling/setup costs, finishing costs, connection costs, handling costs, shipping costs, expediting costs, packaging costs, markups, volume discounts, etc. Pricing parameters can be, for example, per-unit costs/prices or one-time costs/prices, depending on the particular parameter. Fundamentally, there are no limitations on the parameters that can constitute "pricing parameters" other than they can be applied to extracted and non-extracted pricing data or otherwise affect the cost of fabricating one or more instantiations of a structure represented by a computer model.

Firm Fabrication-Price Quote: A "firm fabrication-price quote" is a price at which a user can get one or more parts and/or one or more instantiations of a part fabricated by a fabricator. In other words, it is a price at which a fabricator commits to charging or otherwise honoring for a particular fabrication order. As described below in detail, a firm fabrication-price quote is determined as a function of actual fabrication resource requirements to which a fabricator is subjected.

Actual Fabrication Resource Requirements: "Actual fabrication resource requirements" are fabrication parameters and constraints that a fabricator is subjected to in fabricating the one or more instantiations of the modeled structure. General examples of actual fabrication resource requirements include: engineering/set-up time for fabrication functions such as programming, punching, cutting, molding, casting, deburring, forming, bending, joining, welding, grinding and vibrating, tapping, countersinking, hardware installation, part assembly, inspection, and finishing such as plating and silk screening; available fabricating equipment, and specialized tooling required, among many others. In a sheet-metal fabrication context, examples of actual fabrication resource requirements include sheet sizes of sheet material (e.g., sheet metal), sheet thicknesses of sheet material, number of parts that can be fit on a sheet of material, bend properties (e.g., length, inside radius, angle, count, etc.), constraints on available forming equipment, and corresponding set-up and/or engineering time, among others. In a machining fabrication context, examples of actual fabrication resource requirements include constraints on available machining cutting tools and appurtenances and on part-handling equipment, and any corresponding set-up and/or engineering time, among others. In an injection-molding fabrication context, examples of actual fabrication resource requirements include design and construction of molds, constraints on available injection-molding equipment and/or materials, and any corresponding engineering and/or set up time. In a metal-casting fabrication context, examples of actual fabrication resource requirements include design and construction of molds, constraints on available casting equipment and/or materials, and any corresponding engineering and/or set up time. In a metal-stamping fabrication context, examples of actual fabrication resource requirements include design and construction of dies, constraints on available stamping equipment and/or materials, and any corresponding engineering and/or set up time. Those skilled in the art will readily appreciate that the foregoing examples are non-limiting and that, fundamentally, there is no limit on the actual fabrication resource requirements that can be considered in generating a firm fabrication-price quote of the present disclosure.

Figure 2:
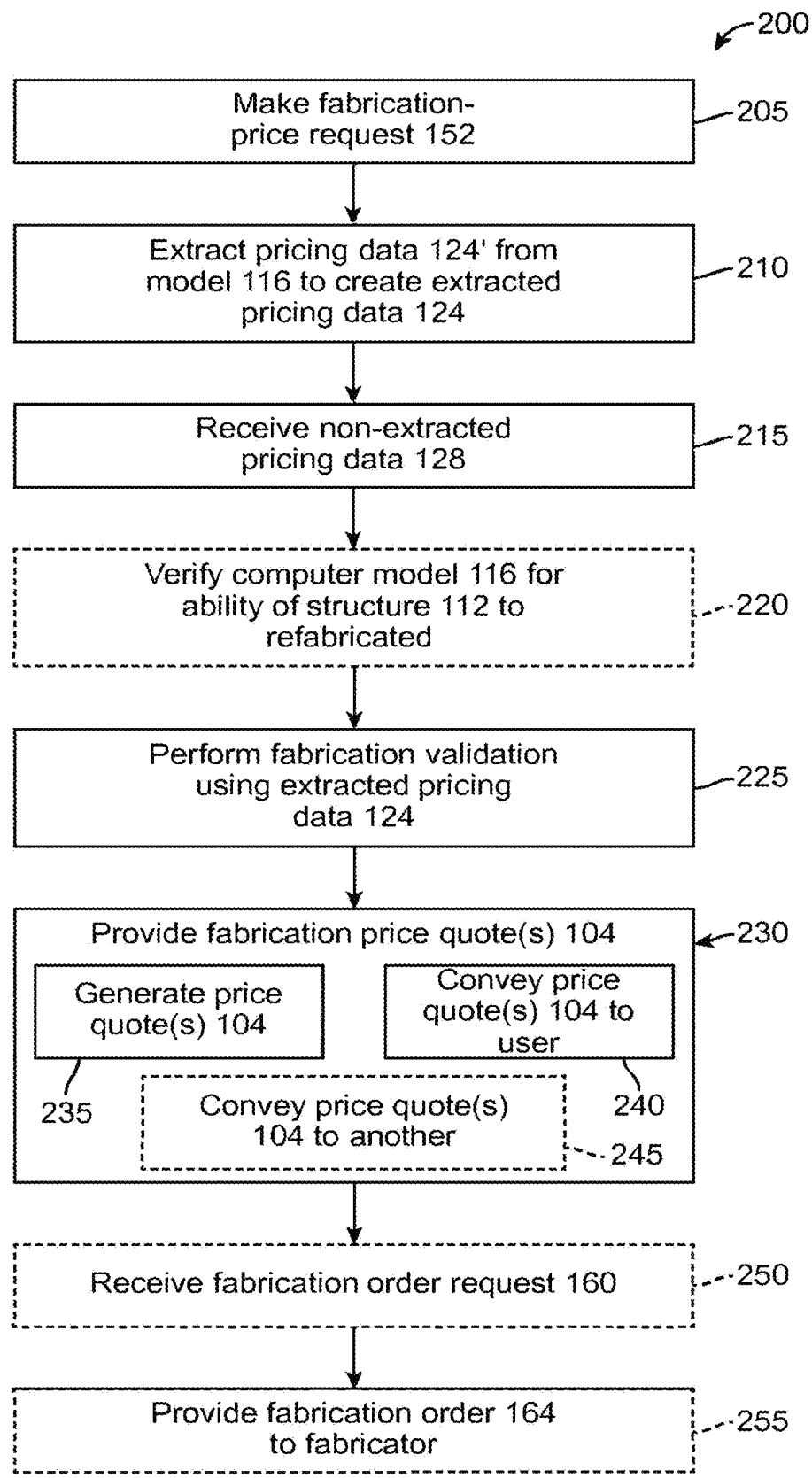
FIG. 2 is a flow diagram illustrating a method of quoting one or more fabrication prices to a user and allowing the user to place a fabrication order based on the quoted price(s) that can be implemented by the fabrication-price-quoting system of FIG. 1.

With the foregoing terms and meanings in mind, reference is now made to FIG. 1, which illustrates a system 100 for providing one or more firm fabrication-price quotes 104 for fabricating one or more instantiations 108(1) to 108(N) of a structure 112 represented by a computer model 116. As will also be seen, system 100 may optionally include features for allowing a user (not shown) to place a fabrication order 120 based on firm fabrication-price quote(s) 104. As described below in more detail, firm fabrication-price quote(s) 104 are based on extracted pricing data 124 (i.e., pricing data 124' extracted from computer model 116), non-extracted pricing data 128, and pricing parameters 132 that are determined as a function of a set of actual fabrication resource requirements 130 of the particular fabricator that is going to, or would, satisfy fabrication order 120 if the user so chooses to place it. As will become readily apparent from reading this entire disclosure, system 100 includes software 136 for performing a method 140 of providing firm-fabrication price quote(s) 104 and allowing a user to place fabrication order 120. FIG. 2 illustrates a fabrication price-quotation and ordering method 200 that is suitable for use as method 140 of FIG. 1. Method 200 is described below in detail. However, before describing method 200 and with continuing reference to FIG. 1, system 100 also includes suitable hardware 144 for executing software 136. In this context, hardware 144 includes all of the corresponding requisite functionality of the physical devices themselves. As those skilled in the art will readily appreciate from reading this entire disclosure, method 140 can be implemented in any suitable computer-based environment, such as in a network of computing devices or in a single computing device. Thus, hardware 144 can include a broad range of computing devices.

Examples of hardware 144 that can be used to implement the various steps of method 140 include, but are not limited to, web servers, desktop computers, laptop computers, tablet computers, smartphones, and Internet appliances, wearable computers (e.g., GOOGLE GLASS™ wearable computers), among others. A network of two or more of such devices can include any one or more types of networks, including, but not limited to, a global communications network (such as the Internet), a wide-area network, a local-area network, and a telecommunications network, among others. In this connection, those skilled in the art will also recognize the myriad of ways that the steps of method 140 can be implemented across a network. For example, if any steps of method 140 are implemented on one or more web-servers, they may be performed by suitable software residing on, provided by, and/or executed by such server(s). Such software can include a software application, a software module (such as a plugin to another software application, such as a computer modeling application, web browser, etc.), and/or a software code segment. In many cases, the same or similar software, or any portion thereof, can be implemented on a desktop computer, a laptop computer, and a tablet computer. As another example, various steps of method 140 can be performed by one or more mobile apps running, on, for example, a smartphone or tablet computer, and provided the ability to communicate with one or more other computing devices running software that performs one or more other steps of the method.

In a particular embodiment, all steps of method 140 can be performed by a single computing device, such as a desktop computer or a webserver accessible via a browser, running an integrated software application that performs all steps of method 140 and that may also include computer-modeling functionality as well, such as a computer-modeling software application 148. In another embodiment, some steps of method 140 can be performed on a first computing device, whereas other steps of the method are performed on a second computing device located remotely from the first computing device across a network. An example of the latter embodiment is described below in connection with FIGS. 3 to 23 as a particular instantiation. Those skilled in the art will understand how to implement any variation reasonably conceivable using only known programming techniques and this disclosure as a guide. Consequently, it is not necessary to describe every potential variation for skilled artisans to practice the present invention to the fullest scope accorded by the appended claims. Regardless of the type of hardware 144 used to implement fabrication-price-quotation and/or fabrication-ordering software 136 made in accordance with the present invention, the hardware works in combination with and under the control of such software to form fabrication-price-quotation and/or fabrication-ordering system 100, which provides functionality described herein.

Referring now to FIG. 2, and also to FIG. 1 for context and noting that 100-series element numerals correspond to FIG. 1 and 200-series numerals correspond to FIG. 2, at step 205 of method 200 a fabrication-price request 152 may be received by software 136 from a user. As noted above, request 152 is for one or more firm fabrication-price quote(s) 104 for fabricating one or more instantiations 108(1) to 108(N) of structure 112, which is represented by computer model 116. Software 136 can receive request 152 in any suitable manner, such as via a user interface (not shown) presented to a user on a computing device accessible to the user. In this example, software 136 may present a user-selectable soft control (not shown), such as a soft button or checkbox, that a user can select to make the request. As those skilled in the art will readily appreciate, the selection of the soft control can be effected in any suitable manner, such as by clicking on or otherwise selecting the control using a pointing device (e.g., a mouse) or by touching a touchscreen at the appropriate location to make the selection. The manner of selection will depend on the particular hardware 144 and configuration of software 136 being used on the user's computing device. As alluded to above, the user interface containing the user-selectable control can be provided application-specific software running on the user's device or a web-browser or other remote-access means that allows the user to access price-quotation software functionality remotely from the user's device. As another example, request 152 may be a more passive request, such as the user opening an application (not shown) of software 136 that provide a user interface for price quoting and/or fabrication ordering tasks; once the user opens the application, software 136 may initiate various ones of its price-quoting and/or ordering functionalities.

At step 210, in conjunction with the user making price-quotation request 152, software 136 extracts pricing data 124' from computer model 116 to create extracted pricing data 124. As described above, extracted pricing data 124 can be any data that a price-quote-generating algorithm 156 of software 136 needs for generating firm fabrication-price quote(s) 104 and that can be found in and automatedly extracted from computer model 116. A benefit to this automated extraction is that a human user is spared the task of determining this information manually or extracting such data semi-automatedly and working with that data outside computer model 116. The more robust the particular computer-modeling software, such as computer-modeling software application 148, is, i.e., the more information about structure 112 at issue it handles, such as material types, finishes, connection details, etc., the less non-extracted pricing data is required. Depending on the way that non-extracted pricing data 128 is acquired by system 100, this can greatly simplify the process for a user in obtaining firm fabrication-price quote(s) 104 from the system. Indeed, if computer model 116 is highly robust, the only types of non-extracted pricing data 128 that a user may need to input are quantity and/or non-structure related information such as delivery criteria.

Those skilled in the art will understand that pricing data 124' can be extracted from computer model 116 in any of a variety of ways, depending on how data-extraction code of software 136 is configured. For example, if the data-extraction code is built into computer-modeling software, such as computer-modeling software application 148, the data-extraction code may be preprogramed to recognize pricing data 124' within computer model 116 and utilize the internal protocols of that application to gather the that data. As another example, if the data-extraction code is implemented as an external plugin module to computer-modeling software, the code might utilize the application's plugin module protocols. As yet another example, if the data-extraction code is executed externally from the computer-modeling application but not as a plugin, the external code may utilize an application programming interface of the application. Regardless of how software 136 and the data-extraction code are configured, those skilled in the art will readily understand how to design the code.

At step 215, non-extracted pricing data 128 is received via software 136. As with extracted pricing data 124, those skilled in the art will readily understand that non-extracted data 128 can be received in any of a variety of ways, depending on how software 136 is configured in a particular instantiation. For example, software 136 may be configured to allow a user to input non-extracted pricing data 128 via a user interface, such as price-quoting user interface 150, that includes one or more data-input features of one or more differing types, such as, but not necessarily limited to, keyed-input fields, drop-down menus, radio-control selectors, hyperlinks, and other selectors, among others. Those skilled in the art will readily appreciate that the type(s) and number of data-input features can depend on the robustness of computer model 116 relative to pricing data 124' that it contains and the variety of options available from a particular fabricator. Regarding the former, as noted above, if a version of computer model 116 includes pricing data 124' such as material type(s), then a non-extracted-pricing-data user interface (not shown) does not necessarily need a data-input feature directed to the material type(s), since that information will be extracted from the computer model. However, for a version of computer model 116 that does not allow the user to specify materials, the non-extracted-pricing-data user interface would need one or more data-input features to allow the user to input the appropriate material(s) needed for an accurate price quote. Of course, material type is but one example of a pricing-data type that can be of either an extracted type or a non-extracted type, and other pricing data that can be of either type can be handled similarly.

A price-quoting user interface of the present disclosure, such as user interface 150, can be implemented in any of a number of ways. For example, if the software code is implemented within computer-modeling software, such as computer-modeling software application 148, then price-quoting user interface 150 may be presented as a graphical user interface of the software application. Similarly, if the software code is executed in a plug-in-type external module, then the user interface may be presented in the same manner. It is noted that such computer-modeling software can be of the type that presents its graphical user interface via an on-screen window under the control of the operating system of the computer on which the application is implemented. However, in other embodiments, the graphical user interface can be presented in another way (via a web-browser, for example) when the computer-modeling software application includes the corresponding software code and is implemented over the World-Wide Web, perhaps in a software-as-a-service model, among others, or when the software code is implemented separately from the computer-modeling software application. Regardless of how the relevant software code is implemented for receiving non-extracted pricing data 128, skilled artisans will be able to create the appropriate software code.

At optional step 220, software 136 can execute a fabricatability algorithm 160 on extracted pricing data 124 from computer model 116 to determine the ability of structure 112 to be fabricated and, therefore, for one or more instantiations 108(1) to 108(N) to be made. Just because a particular structure can be the subject of a computer model, such as structure 112 of computer model 116, does not necessarily mean that all of its features can be fabricated. For example, a certain fabricator may have various limitations on the types of fabrication processes it can perform. As an example, a fabricator may be limited in the types of finishes it can provide, and if a particular computer model specifies a certain finish that the fabricator cannot provide, this can be determined at the validation step. As another example, a particular computer model can also or alternatively be validated for compliance with one or more design requirements, such as a design code or other requirement. In either case, software 136 can notify the user about any noncompliance in any suitable manner and, depending on the noncompliance, may provide the user with an opportunity to proceed with obtaining fabrication-price quote(s) 104, which may only be an estimate if the price-quote-generating algorithms 156 of software 136 cannot properly account for the noncompliance, or to abandon the fabrication-price quotation and/or to remedy the noncompliance before proceeding with the price quotation.

At step 225, software 136 may perform a fabrication validation of computer model 116 to determine how the one or more instantiations 108(1) to 108(N) can be fabricated given a set of fabrication parameters/constraints on the fabrication of instantiations 108(1) to 108(N), i.e., give a set of actual fabrication resource requirements 130. Fabrication validation at step 225 can take any of a variety of forms. For example, in some embodiments fabrication validation at step 225 may require an analysis of virtual features and characteristics of computer model 116, and therefore the actual physical features and characteristics of structure 112, to determine precisely how the one or more instantiations 108(1) to 108(N) will be fabricated in view of the limitations at play. As another example, in other embodiments, fabrication validation at step 225 may include correlating extracted and/or non-extracted pricing data 124, 128 with the appropriate actual fabrication resource requirement(s) 130 and, therefore, with the corresponding pricing parameter(s) 132. Step 225 can be an important step because the details of how the one or more instantiations 108(1) to 108(N) are fabricated directly influence the cost of fabrication to the fabricator and, therefore, the amount of the corresponding firm fabrication-price quote 104 that the fabricator is willing to charge for the fabrication. Those skilled in the art will readily appreciate the importance of fabrication validation to be able to provide a reliable firm fabrication-price quote 104 that accurately accounts for the cost that the fabricator incurs.

In the context of system 100 of FIG. 1, fabrication validation at step 225 may be performed automatedly by software 136 using extracted pricing data 124, or portion thereof, and/or non-extracted pricing data 128 in a fabrication validation algorithm, such as validation algorithm 164 of FIG. 1, to associate the pricing data with the appropriate one(s) of the available fabrication resources that would be used by the relevant fabricator to fabricate the one or more instantiations 108(1) to 108(N). A result of this validation is a set of actual fabrication resource requirements 130, which corresponds to the appropriate set of price parameters 132 to be used in the fabrication. As one example of fabrication validation that can occur at step 225, the physical size of structure 112, and/or any part(s) thereof, to be fabricated can be accounted for. For example, if structure 112 is a sheet-metal structure, it is often the case that the construction materials come in a maximum sheet size, such as 60 inches (152.4 cm)×120 inches (364.8 cm), and that sheet size affects how the structure, or part(s) thereof, can be fabricated. In turn, the sheet size limitation can affect the cost of fabricating each of the one or more instantiations 108(1) to 108(N). For example, if structure 112 is too large to be formed from a single sheet, then there will be additional cost, such as, for example, for welding sheets together, additional cutting, and handling oversize pieces. Validation algorithm 164 can be designed and configured to use extracted pricing data 124 to determine the fabrication details and the corresponding additional costs. As another example, if structure 112 and/or one or more parts of the structure are sized so that multiple ones can be formed from a single sheet of material, then validation algorithm 164 can be designed and configured to use extracted pricing data 124 to determine how many instantiations of the structure/parts can be made from each sheet of material and, correspondingly, how much fabrication in this manner will cost and, ultimately, impact firm fabrication-price quote 104.

Examples of other cost-influencing actual fabrication resource requirements that validation algorithm 164 may be designed and configured to verify against extracted pricing data 124 of computer model 116 and optionally non-extracted pricing data 128 include, but are not limited to, set-up and/or run times corresponding to finishing, silk screening, tapping, countersinking, hardware installation, assembling multiple parts, bending, rolling, welding (dependent on type, length, finish, method, etc.), and bend characteristics, such as length, radius, angle, etc. Those skilled in the art will understand how to implement a validation algorithm, such as algorithm 164, using extracted and/or non-extracted pricing data 124, 128 and actual fabrication resource requirements 130 to provide fabrication details needed to permit acceptable and reliable firm fabrication-price quotes, such as firm fabrication-price quotes 104.

At step 230, software 136 provides firm fabrication-price quote(s) 104 as a function of extracted pricing data 124 and non-extracted pricing data 128, which includes pricing results from fabrication-validation algorithm 164. Depending on the configuration of software 136 and where the various software components of the price-quoting portion of the software are physically executed, step 230 will typically include several substeps. For example, at substep 235, software 136 may generate firm fabrication-price quote(s) 104 by, for example, applying various ones of pricing parameters 132, such as unit costs, to various ones of the extracted and/or non-extracted pricing data 124 and 128, which, again, includes pricing resulting from fabrication-validation algorithm 164, adding other ones of the pricing parameters, such as fixed setup costs, and applying non-extracted data, such as a number of instantiations for multiple instantiations, to one or more subtotals for a single instantiation, among other things. The precise pricing-quote-generating algorithms 156 used in a particular embodiment will be highly dependent upon, for example, the type(s) of structure(s) 112 handled by software 136, as well as the particularities of the fabricator(s) needed to fabricate the instantiation(s). However, algorithms 156 will be readily implemented by those skilled in the art. It is noted that fabrication-price quote(s) 104 can include, for example, a price per instantiation and/or a total price for multiple instantiations.

Depending on where price-quote-generating algorithms 156 are physically executed within system 100 and where various ones of pricing parameters 132 are stored within the system, one or more of the pricing parameters may need to be obtained by one computer from another computer within the system. Ensuring the use of the most recent set of pricing parameters 132, i.e., verifying current pricing parameter data, is critical, because firm fabrication-price quote(s) 104 are firm quotes that the fabricator will charge for the requested fabrication. Software 136 can be configured in a number of ways to verify current pricing parameter data, i.e., to ensure that price-quote-generating algorithms 156 use the most up-to-date set of pricing parameters 132. For example, if price-quote-generating algorithms 156 are executed on a user computer and pricing parameters 132 are stored and updated on a server, such as a fabricator's server, before the pricing algorithms are executed, the portion of software 136 running on the user computer may request the current pricing parameters from the server. In another example in which price-quote-generating algorithms 156 are executed on a user computer, pricing parameters 132 may be downloaded to the user computer as updates are available. In yet another example wherein price-quoting algorithms 156 are executed on a server, such as fabricator's server or a software-as-a-service server, and substantially the entire price-quoting system 100 is based on that server, price-quoting parameters 132 would be locally available to price-quote-generating algorithms 156 for execution. As still another example of how, software 136 can be configured to make a validity query to the particular fabricator's pricing parameter datastore (not shown) that is maintained by the fabricator. Such a validity query can be structured in any suitable manner, such as by comparing a data set version identifier, which may be a unique code, date stamp, or combination thereof, among others. Software 136 may make this query at any suitable time, such as when the user makes fabrication price request 152. Of course, these are but a few examples of where pricing parameters 132 can be stored and updated relative to where price-quote-generating algorithms 156 can be stored and executed.

It is noted that in some embodiments in which at least some aspects of software 136 are integrated with computer-modeling software, such as computer-modeling software application 148, software 136 may be configured to update fabrication-price quote(s) 104 every time a user makes a change to computer model 116 in essentially real time. This can be accomplished, for example, by software 136 monitoring model 116 for any changes that create one or more new pieces of pricing data 124' within model 116 and modifying one or more pieces of the pricing data in the model. Then, when software 136 detects any new and/or changed data, it can cause price-quote-generating algorithms 156 to recalculate price quote(s) 104 using the corresponding new and/or changed data. For example, as a user adds a weldment to existing structure 112 within model 116, software 136 may update price quote(s) 104 on the fly, such as when the user adds a member for the weldment and when the user adds a bolt-hole to that member. In some alternative embodiments, software 136 may be configured to allow a user working with computer-modeling software, such as computer-modeling software application 148, to select an update button or the like to cause price-quote-generating algorithms 156 to update price quote(s) after making changes to structure 112 within computer model 116. In still other embodiments, software 136 may be configured to allow a user to choose whether or not to update automatically or manually based on user input. This configuration may be desirable, for example, when continuous updating is premature (e.g., computer model 116 is far from completion) or when continuous updating requires so many computer resources that other functionality is impaired. Those skilled in the art will readily understand the wide variety of ways that updating of price quote(s) 104 can be implemented.

Step 230 may also include a substep 240 at which software 136 conveys fabrication-price quote(s) 104 to the user in any one or more of a variety of ways. For example, fabrication-price quote(s) 104 can be displayed on a display screen (not shown) of the user's computer (e.g., within price-quoting user interface 150), conveyed in an email, and/or provided in some other type of message, including regular mail, an instant message, a text message, etc. and/or as an attachment thereto, among others. Fundamentally, there are no limitations on how a fabrication-price quote can be conveyed to a user.

Step 230 may further include a substep 245 at which software 136 conveys fabrication-price quote(s) 104 to an entity other than the user. For example, the detailed example described below in connection with FIGS. 3-23 includes a step of providing a fabrication-price quote to a customer portal of a fabricator. In that example, by conveying the fabrication-price quote to the customer portal, the user can readily place an order via that portal. As those skilled in the art will readily appreciate, the customer portal may be conveyed, for example, via a fabricator's server or a provider with which the fabricator contracts for such services.

At optional step 250, software 136 may receive a fabrication order request 168 in any suitable manner, such as via a user interface (e.g., price-quoting user interface 150) presented to a user on a computing device accessible to the user. In this example, software 136 may present a user-selectable soft control (not shown), such as a soft button or checkbox, that a user can select to make the request. As those skilled in the art will readily appreciate, the selection of the soft control can be effected in any suitable manner, such as by clicking on or otherwise selecting the control using a pointing device (e.g., a mouse) or by touching a touchscreen at the appropriate location to make the selection. The manner of selection will depend on the particular hardware 144 and configuration of software 136 being used on the user's computing device. As alluded to above, the user interface containing the user-selectable control can be provided application-specific software running on the user's device or a web-browser or other remote-access means that allows the user to access price-quotation software functionality remotely from the user's device.

At optional step 255, in response to receiving fabrication order request 168, software 136 provides a fabrication order 172 to the fabricator. Step 255 may be accomplished in any suitable manner, such as sending an email to the fabricator, placing a work order in a queue of a fabricator's scheduling software, among others. Fundamentally, there is no limitation on the way that fabrication order 172 may be made to the fabricator.

It is particularly emphasized that the order of performance of the foregoing steps of method 200 need not be as shown. Rather, they may be implemented in any logical order that results in one or more price quotes and/or one or more fabrication orders.

Exemplary Embodiment for Sheet Metal Fabrication

Whereas the foregoing description describes various aspects of the present invention generically while providing some examples of ways those aspects can be implemented, the following description is primarily directed to a particular detailed embodiment. While this embodiment is described in fairly extensive detail, it should be understood that it is merely illustrative and should not be considered as limiting the much broader scope of the invention. Indeed, as alluded to above, the specific instantiations of the features and software described below are merely one set of such instantiations and features, and those skilled in the art will readily understand that many variations of each individual instantiation and feature are possible, as are differing combinations of these instantiations and features and other instantiations and features.

As will become apparent from reading the following description of this detailed embodiment, the example described below includes a price-quote system and customer portal that allows a customer (i.e., a user) of a sheet-metal fabricator to get an instant firm fabrication-price quote for fabricating one or more instantiations of a structure represented in a computer model that is designed in computer-modeling software, here SOLIDWORKS software. As noted above, the firm fabrication-price quote is not simply an estimate, but rather a firm quote on which a user can place a fabrication order and that the fabricator will honor baring extenuating circumstances. In this illustrative example, the price-quoting software includes a price-quoting application that resides on a user computer as a plugin to the SOLIDWORKS software and obtains user-entered form data (i.e., non-extracted pricing data) and extracts pricing data from the computer-modeling software on the user computer to create the extracted pricing data. Examples of pricing data that can be extracted include but are not limited to, material thickness, part perimeter, flat size, formed size, tap hole types, tap hole count, countersink hole types, countersink hole count, open loops, weld types, weld length, bend angle, bend length, bend radius (ii), hole diameters, hole depths, embosses, silkscreen cuts, and hardware, among others.

In this example, the user provides data pertaining to the material, finish, and quantity for a particular structure or for multiple differing structures, such as differing parts. Once the user has selected the desired options for each part, in this example, that part can be added to a collection of saved parts. Upon successfully creating a full list of parts, in this example the user then selects a soft-button to generate an instant firm fabrication-price quote and spawn an email to the user that includes, in this particular instantiation, a portable document format (PDF) file. In this example, the PDF file includes a detailed list of parts the user has chosen for a quotation and includes a picture of each part. In this particular embodiment, the PDF quote file and computer model is also uploaded to a system file-transfer-protocol (FTP) server located remotely relative to the user computer. As such, if the customer decides to place an order, it can be processed without requiring any additional information from the customer other than a purchase order (PO) number, which is included in the PDF file.

Figure 3:
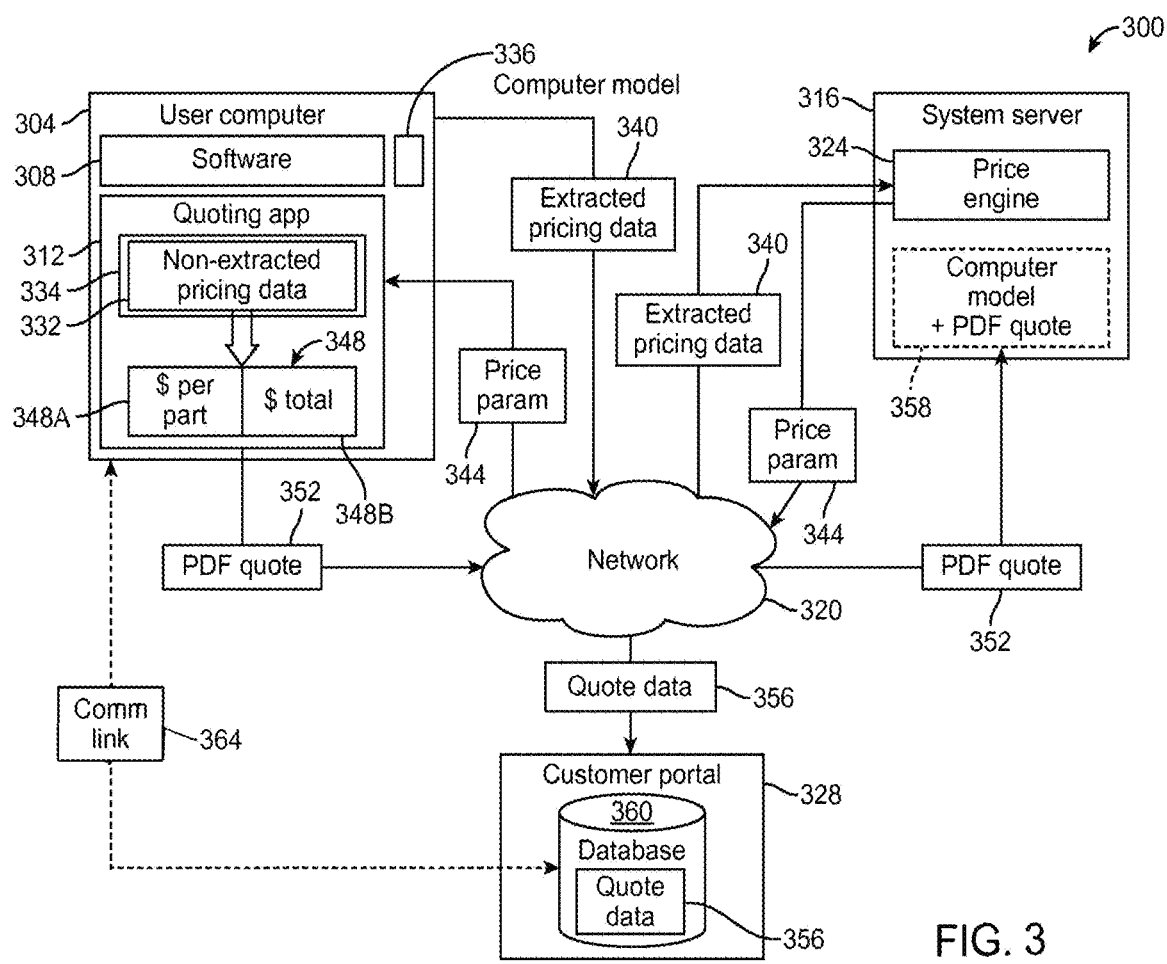
FIG. 3 is a high-level schematic diagram of a particular embodiment of a fabrication-price-quoting- and ordering-system made in accordance with the present disclosure.

Reference is now made to FIG. 3, which shows an overview block diagram of an overall system 300 that executes price-quoting software for generating firm fabrication-price quotes in accordance with the illustrative embodiment introduced immediately above. As shown, system 300 includes a user computer 304 having computer-modeling software 308 running thereon. User computer 304 also runs a price-quoting application 312 that is an add-on to the computer-modeling software. System 300 also includes a price-quoting system server 316 located remotely from user computer 304 and in operative communication with the user computer via an external communications network 320 (i.e., external to the computing device(s) executing any portion of the price-quoting software). Network 320 can comprise any acceptable network for receiving and transmitting data, including the broad Internet, local area networks (LANs), wide area networks (WANs), telecommunications networks, WiFi, Bluetooth, MiFi, or any other acceptable network connection known in the art, and any combination thereof. System server 316 runs a pricing engine 324 that provides pricing functionality described below. In this example, system 300 further includes a customer portal 328, which is a portal for the fabricator that allows customers to place fabrication orders directly through the system. It is noted that an order can also be placed directly from price-quoting application 312. Although customer portal 328 is shown as being located separate from server 316 so as to require communication over network 320, this need not necessarily be so. For example, customer portal 328 can readily be a part of server 316 in some embodiments.

With the general arrangement of various elements of system 300 in mind as just described, following is a description of how the system can work to implement a particular instantiation of price-quoting software illustrated in FIG. 3. Price-quoting application 312 allows a user to input non-extracted pricing data 332 via user computer 304, in this case via a form 334, and extracts pricing data from a computer model 336 of a structure to create extracted pricing data 340, which is sent over network 320 to system server 316. As described above extracted pricing data 340 includes identifiers and data associated therewith for determining the virtual features of computer model 336 that require fabrication or other similar manufacturing.

Pricing engine 324 performs real-time "on-the-fly" instantaneous pricing using various pricing parameters 344. In this embodiment, pricing engine 324 sends one or more firm fabrication-price quotes 348 via network 320 to price-quoting application 312. Price quotes 348 may include either or both of a price per part 348A and the total price 348B, which price-quoting application 312 can display to the user via user computer 304. In this example, the price-quoting application 312 also generates a PDF quote 352 that it transmits via network 320 to system server 316 so that computer model 336 and PDF quote 352 are available on the system server when the user decides to order the parts in the quote. It is noted that PDF quote 352 can be stored on system server 316 in conjunction with computer model 336 in a pending order 358. Quoting application 312 also sends quote data 356 via network 312 to customer portal 328, which as shown and described in greater detail hereinbelow, includes (or is operatively connected to) a database 360 in which the quote data 356 is stored so that it is available the user when accessing the customer portal. Interaction of the user via user computer 304 with customer portal 328 is represented by a communications link 364.

Figure 4:
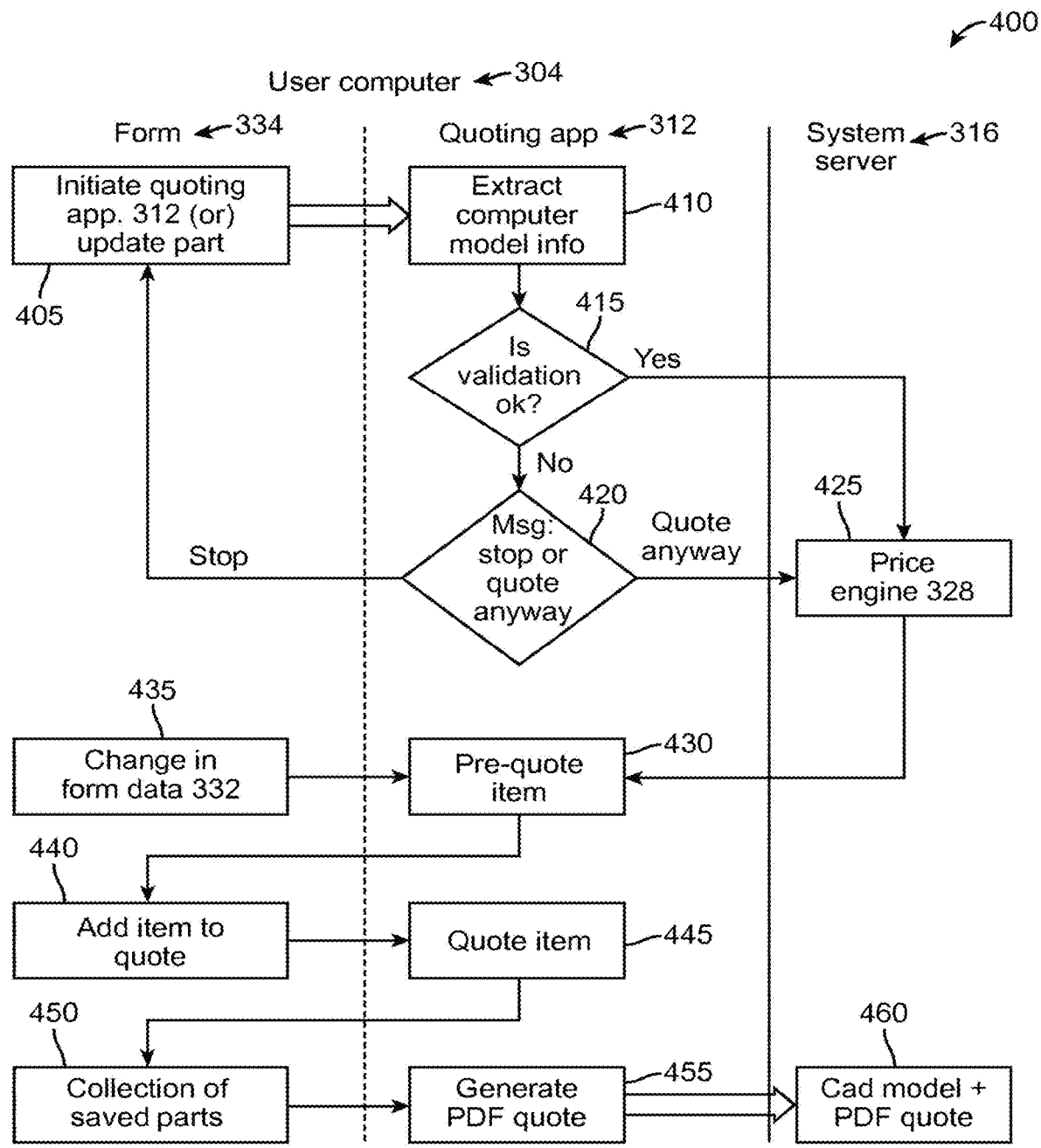
FIG. 4 is a flow diagram illustrating a method for generating firm fabrication-price quotes as implemented by the fabrication-price-quoting- and ordering-system of FIG. 3.

FIG. 4 illustrates a method 400 for generating firm fabrication-price quotes within system 300 of FIG. 3. To assist with relating system 300 to method 400, FIG. 4 depicts method 400 in terms of the hardware and software that performs the various steps. At step 405, the user engages form 334 to initiate price-quoting application 312 or update the part. Then, at step 410, quoting application 312 generates extracted pricing data 340 by extracting data from computer model 336.

At step 415 it is determined whether the part is valid, i.e., whether or not the part meets the fabricator's criteria for successfully fabricating instantiations of the part represented by computer model 336. In this example, validation step 415 is not a stopping point, but a check as to the validation of the part. If the validation is not acceptable, then quoting application 312 may, at step 420, deliver a message (not shown) to the user (see FIG. 16 and the corresponding description) to determine whether they want to stop the price quote, and return to step 405, or whether they want to receive the price quote anyway and continue to the price engine 328. If validation step 415 results in the part being acceptable, then method 400 advances to step 425 without any warning messages.

Figure 6:
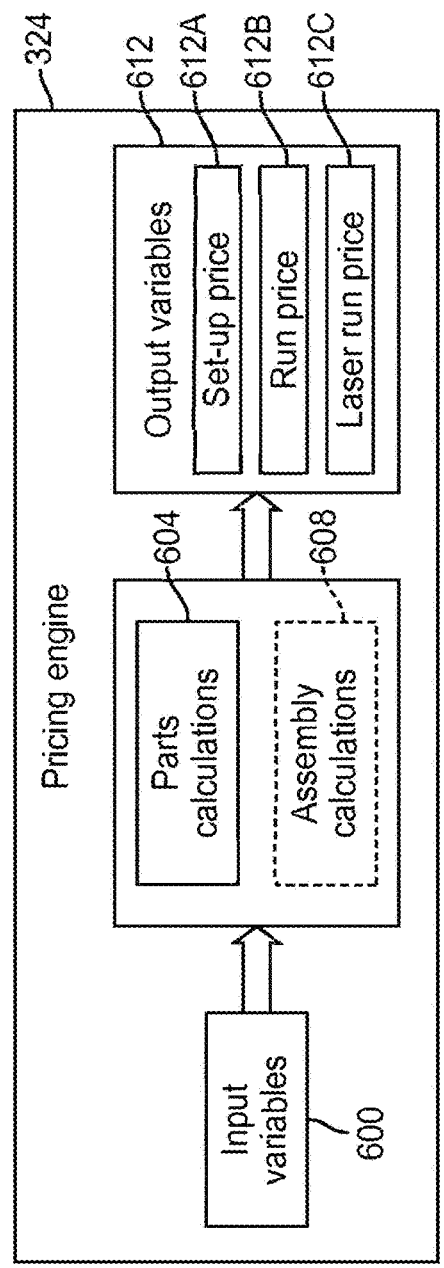
FIG. 6 is a high-level block diagram of the pricing engine of the fabrication-price-quoting- and ordering-system of FIG. 3.

At step 425, price engine 328 provides price parameters 344 to price-quoting application 312 to pre-quote the item at step 430. An illustration of a pricing method performed by pricing engine 324 is shown in FIG. 6 and described below. It is noted that the validation analysis performed in conjunction with step 415 can include both a fabricatability analysis and a fabrication-validation analysis, each of which may be performed using a suitable algorithm, such as fabricatability algorithm 160 and fabrication-validation algorithm 164, respectively, described above relative to FIGS. 1 and 2.

Figure 7:
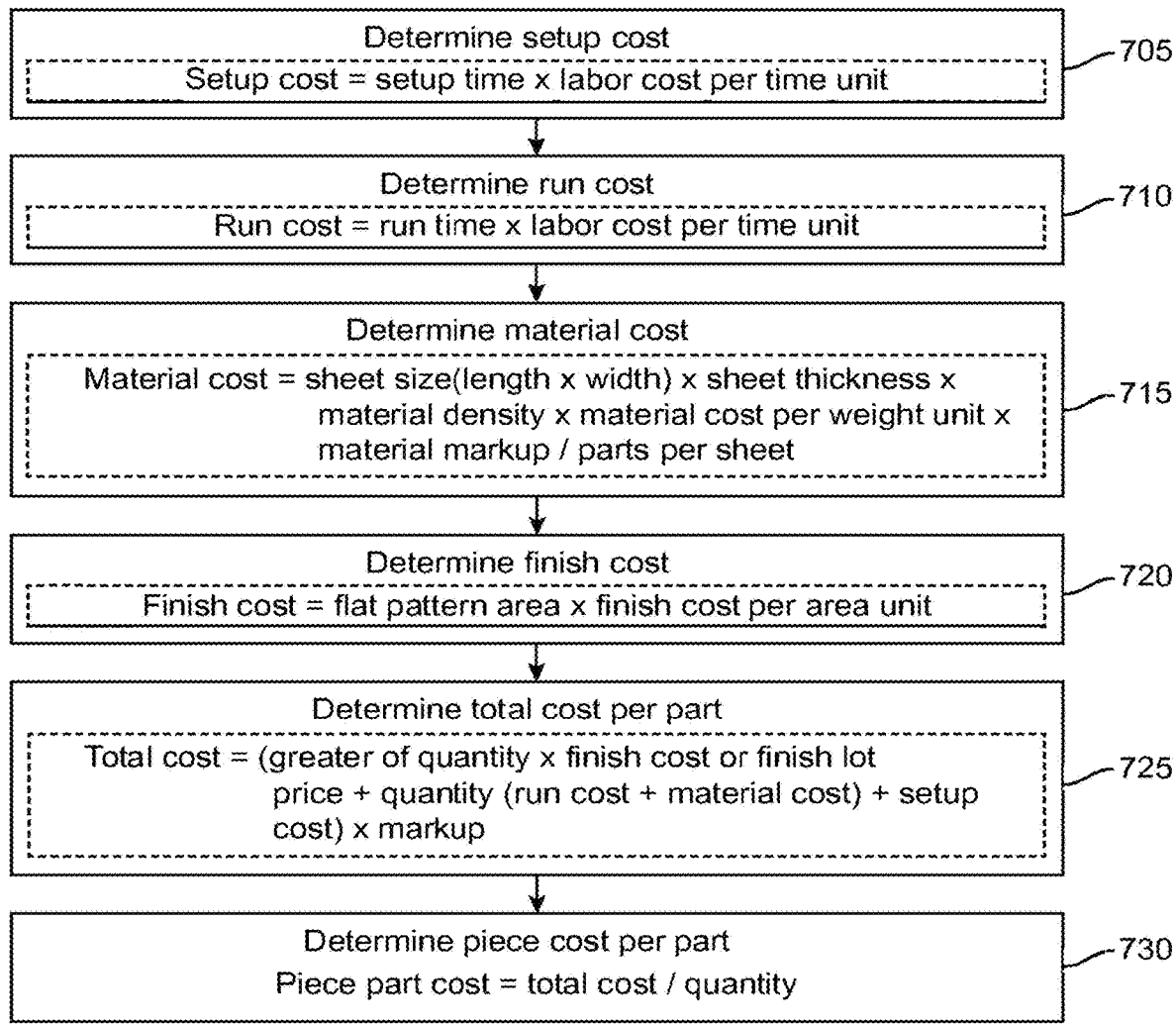
FIG. 7 is a method for determining a pre-quote of a part desired to be fabricated as implemented by the fabrication-price-quoting- and ordering-system of FIG. 3.

A change in non-extracted pricing data 332 at step 435 causes price-quoting application 312 to pre-quote the part at step 430. FIG. 7, described below, illustrates a method 700 of performing the pre-quote of a part when generating quotes. At step 440, a pre-quoted part is added to the price quote on form 334. Then, at step 445, the part is quoted using price-quoting application 312, and at step 450 a collection of saved parts are displayed on the form 334. At step 455, price-quoting application 312 generates PDF quote 352 using the collection of saved parts. At step 460, price-quoting application 312 sends computer model 336 and PDF quote 352 to system server 316. In this manner, computer model 336 and PDF quote 352 are available on system server 316 when the user determines they want to place an order based on the quote. In an illustrative embodiment, the user need only supply a purchase order (PO) number associated with the quote to place a fabrication order.

Figure 5:
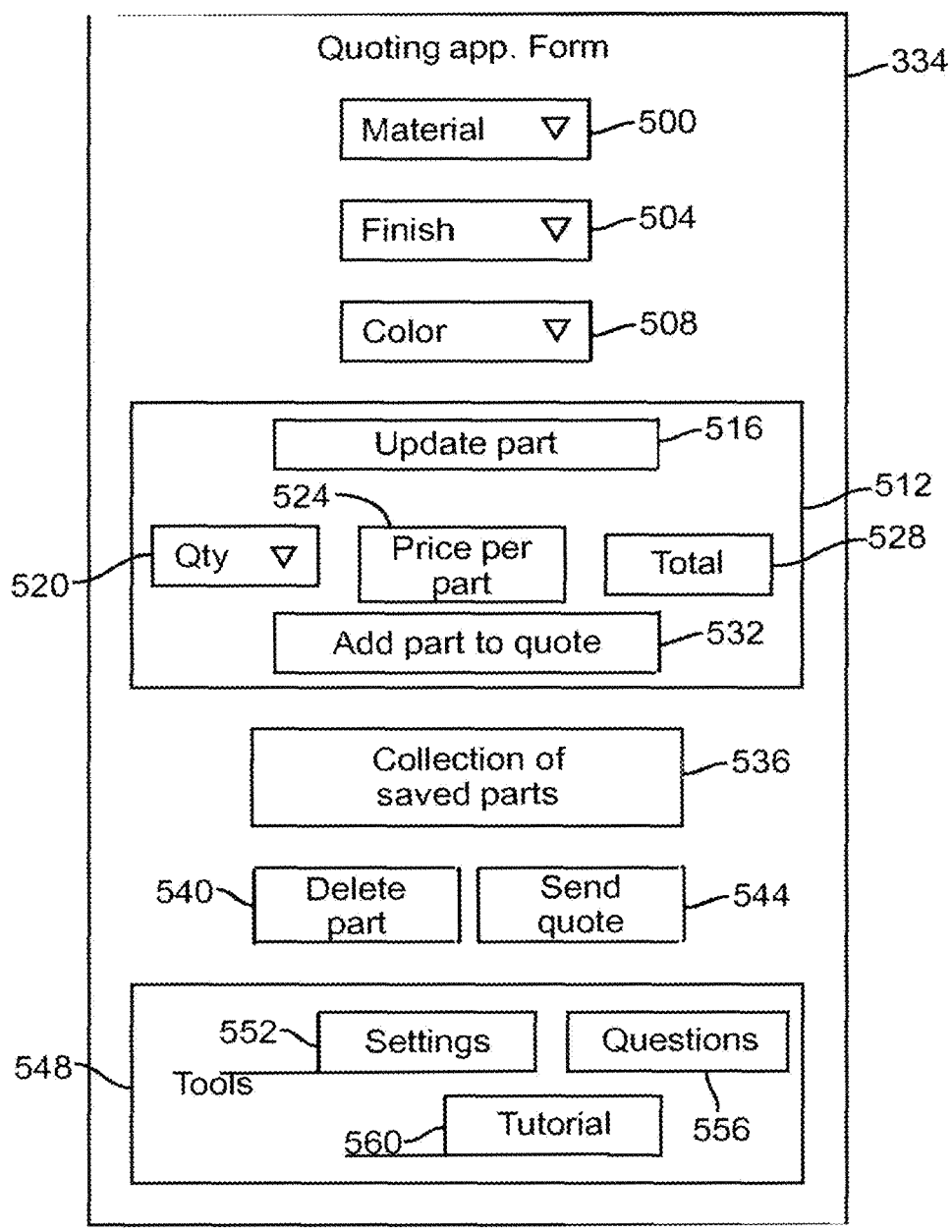
FIG. 5 illustrates a user-input and control graphical user interface of the fabrication-price-quoting- and ordering-system of FIG. 3.

FIG. 5 illustrates an exemplary graphical user interface (GUI) version of form 334 (FIG. 3) showing various pieces of non-extracted data 332 and other information, as well as various controls and tools for controlling and/or interacting with price-quoting application 312 (FIG. 3). In accordance with an illustrative embodiment, form 334 includes a material drop-down menu box 500, a finish drop-down menu box 504 and a color drop-down menu box 508 from which the user can select, respectively, a material, a finish type, and a color for the instantiation(s) to be fabricated.

Price-quoting application 312 (FIG. 3) can be constructed and arranged to limit the material, finish and/or color to those only available for the particular item, material type, etc., a user is quoting. Once the user has selected a material, finish, and color, the user interacts with a pricing portion 512 of form 334. In this example, pricing portion 512 includes an Update Part button 516, a quantity drop-down box 520, a price-per-part display region 524, a total-price display region 528, and an Add Part To Quote button 532. The user can update a current part by selecting Update Part button 516 and can update the quantity of parts by selecting from drop-down box 520. Any change in the material, finish, color, quantity, and/or selection of Update Part button 516 results in an automatic update of the price per part displayed in region 524 and the total price displayed in region 528. It is noted for completeness that the price per part is the price of fabricating a single instantiation of the part, and the total price is the total price for fabricating the entire quantity of instantiations specified in quantity drop-down box 520.

The user can then add the part to the quote by selecting the Add Part To Quote button 532. Selection of Add Part To Quote button 532 results in the part being added to a collection-of-saved-parts region 536, which lists the parts currently included in the price quote. The user can delete a part from collection-of-saved-parts region 536 by selecting a Delete Part button 540. The price quote can be sent by selecting a Send Quote button 544, which results in the sending of PDF quote 352 and quote data 356 (FIG. 3).

In this example, form 334 also includes various tool buttons 548, including a Settings button 552, a Questions button 556, and a "Tutorial" button 560. Tutorial button 560 directs the user to a website (not shown) in which they can view instructional and other educational videos and resources, as shown and described in greater detail herein, for example, with reference to FIGS. 17 and 18.

Reference is now made to FIG. 6, which illustrates the operation of pricing engine 324 of FIG. 3 at a high level. As seen in FIG. 6, pricing engine 324 obtains a plurality of input variables 600. Note that in this particular instantiation the variables provided are in connection with the fabrication of custom sheet metal products. It is expressly contemplated that, in alternate embodiments, the variables and other aspects of the system can be adapted to other particular types of fabrication. Some non-limiting examples include machined parts, both milled and turned, extruded parts, stamped parts, molded parts, in particular injection molded parts, and the like. It should be clear to those of skill which particular variables are relevant to a given model or production manufacturing/fabrication process. These exemplary variables can comprise (but are not limited to) thickness, perimeter, bend total count, tap hole types, counter sink types, counter sink count, flat size, bend set ups, weldment total length, cut length, flat area, parts per sheet, and formed size. Variables 600 are used to determine parts calculations 604 and, where applicable, assembly calculations 608. Calculations 604 and 608, if applicable, then provide output variables 612, which may include a setup price 612A, a run price 612B, and a laser run price 612C, among others. In the parts calculation 604, parameters used in determining a price may include engineering, laser, punch, deburr, tap and counter sink holes, forming, welding, hardware insertion, finishing, and shipping, among others. In this example, in order to perform on-the-fly pricing, the setup price and the run price are not combined in the initial calculations. The result of parts calculations 604 is sent to price-quoting application 312, and the remainder of the calculations are done on-the-fly. Each material typically has a different run price 612B, so to perform the on-the-fly pricing, this is typically not included in the collection part run rate, which is the sum of all run values except the ones dependent on the selected material. The on-the-fly calculation are performed this way to be efficient even though a user can change the material generally at any time.

As noted above, FIG. 7 illustrates a method 700 of determining a pre-quote for a part (see step 430 of method 400 of FIG. 4) when generating quotes for a part and/or assembly in accordance with the illustrative embodiment that began with FIG. 3. At step 705, a setup cost is determined. In one example, the setup cost is equal to a setup time multiplied by a labor cost per unit time. At step 710, a run cost is determined. In one example, the run cost is equal to a run time multiplied by a labor cost per time unit. At step 715, a material cost is determined. In one example in which sheet metal is the basic fabrication material, the material cost is equal to the length of a sheet multiplied by the width of the sheet thickness multiplied by the density of the material multiplied by the material cost per weight unit multiplied bt the material markup, which is all divided by the parts per sheet. This calculation is particularly important in the fabrication and manufacturing of prototype parts, which typically wastes some excess material in fabricating the part. At step 720, the finish cost is determined. The finish cost is equal to the flat pattern area multiplied by the finish cost per unit area. Then, at step 725, a total fabrication cost is determined. The total cost is equal to the greater of the finish lot charge value or the quantity multiplied by the finish cost value, the result of which is then added to the sum of the run cost and the material cost multiplied by the quantity, the result of which is then added to the setup cost, and the result of that calculation may be multiplied by a markup. This markup can be, for example, a customer discount code, a coupon code, a sales commission, or a combination of these, among other things. At step 30, a piece part cost is determined by dividing the total cost by the quantity.

In the present exemplary instantiation, the set up price and run price comprise information that is accessed from server 316 (FIG. 3) because it is not dependent on the material or the quantity. The labor time at steps 705 and 710 are fixed values also accessed from server 316. The parts per sheet, thickness, and flat area used in the calculations are fixed pre-quote class values, which are not passed to pricing engine 324 (FIG. 3). The density, cost per pound, finish lot price, finish cost per area unit, and quantity are values input by the user on price-quoting application form 334 (FIG. 3). In an assembly quote, the method 700 loops through all of the data for all parts in the assembly, including hardware setup cost, hardware run cost, hardware material price and shipping.

The ability to provide firm fabrication-price quotes quickly is enabled by keeping the setup and run costs completely separated throughout the procedure. When run cost, finish cost, and material cost are calculated, this is only performed for a quantity of one. Then this number is later multiplied by the quantity, which enables on-the-fly pricing per steps 725 and 730.

It is noted that method 700 is shown as having its steps in a specific order for the purposes of illustration. However, the steps can be implemented in any order within ordinary skill to achieve the cost calculations shown and described herein.

Exemplary Run-Time Operational Instantiation of Sheet Metal Fabrication Embodiment Reference is now made to FIGS. 8-16, which illustrate various exemplary screenshots for a run-time operational instantiation of system 300 of FIG. 3. The various screenshots are exemplary of illustrative screen displays that a user would view on user computer 304 (FIG. 3) during operation of price-quoting application 312 in computer-modeling software 308.

FIG. 8 is an exemplary screen display window 800 showing log-in information for a registered user of price-quote system 300 (FIG. 3). As shown in FIG. 8, window 800 provides a user with various input fields for inputting their personal data, including a Registered-User E-Mail address field 804, a First Name field 808, a Last Name field 812, a Company name field 816, and Phone Number fields 820. Shipping information can also be entered, including a First Name field 824, a Last Name field 828, a Company name 832, an Address 1 field 836, an Address 2 field 840 where applicable, a City field 844, a State field 848, a Zip Code field 852 and Phone Number fields 856. Window 800 also includes a save-information control 860 that allows the user to save the inputted information.

Figure 9:
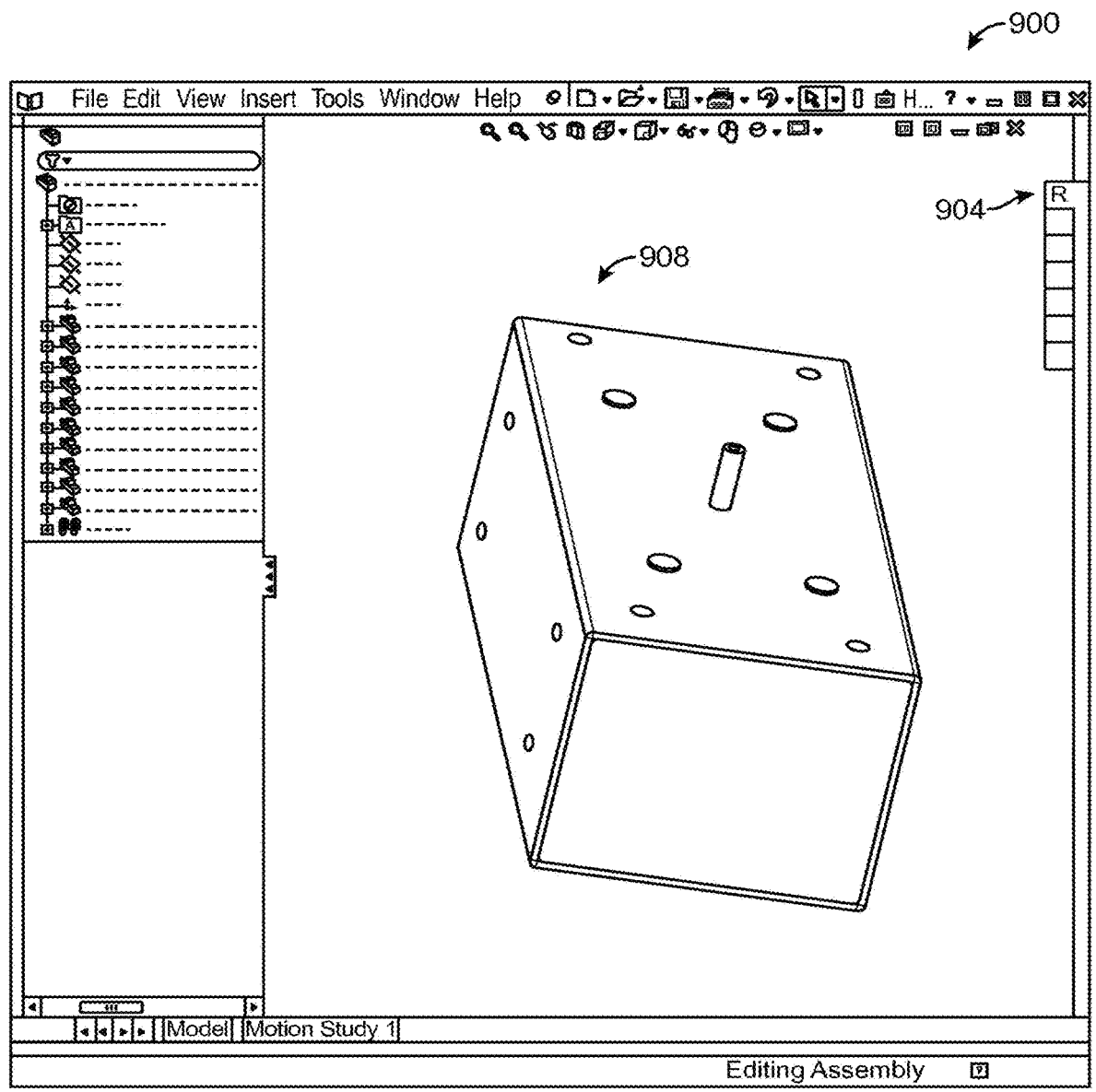
FIG. 9 is a screenshot of a display window of a particular instantiation of the fabrication-price-quoting- and ordering-system of FIG. 3, before initiation of the price-quoting application interface.

FIG. 9 is an exemplary screen display window 900 of computer-modeling software 308 (FIG. 3), in which price-quoting application 312 is not in use. Window 900 includes a tab 904 that allows a user to open a price-quoting application interface (not shown). For illustrative purposes, window 900 is shown displaying a rendering 908 of a particular instantiation of computer model 336; here, for example, the user has uploaded the model and desires to obtain a fabrication-price quote for the part represented by the rendering.

Figure 10:
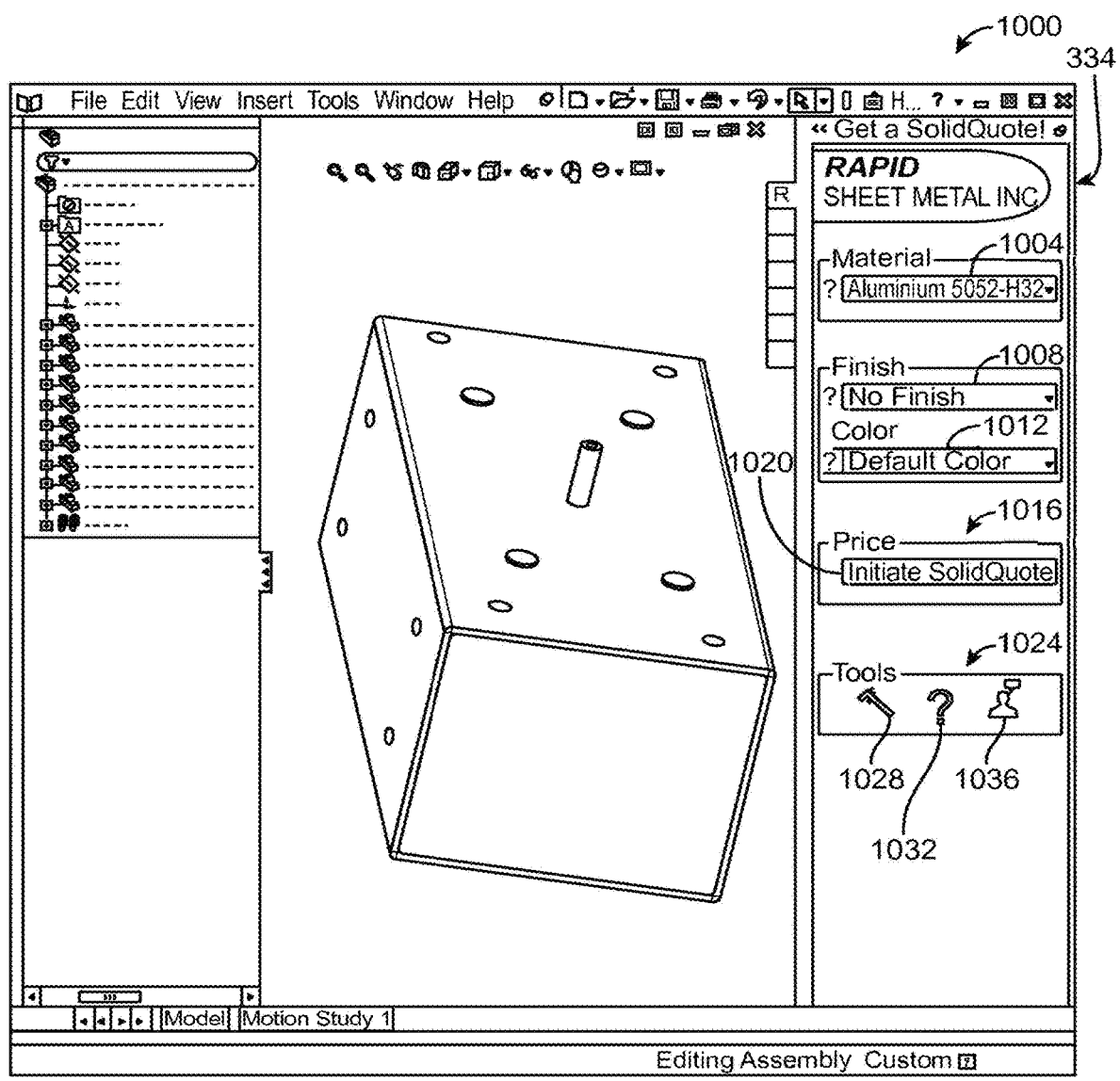
FIG. 10 is a screenshot of a display window of a particular instantiation of the fabrication-price-quoting- and ordering-system of FIG. 3, after initiation of the price-quoting application interface.

When the user selects tab 904, computer-modeling software 308 (FIG. 3) opens, in a suitable display window 1000, form 334 (FIG. 3), which, as described above, allows the user to request a firm fabrication-price quote. As seen in FIG. 10, form 334 includes a Material drop-down menu box 1004, a Finish drop-down menu box 1008, and a Color drop-down menu box 1012 that allow the user to select, respectively, a material from which each part is to be made, a type of finish for the part, and, if applicable to the selected finish, a color of the finish. Form 334 also includes a Price region 1016 that contains an Initiate Quote soft button 1020 that the user would select to signal price-quoting application 312 (FIG. 3) to initiate the fabrication price quoting process. In this example, form 334 also includes a tool selection region 1024 that include a settings selector 1028, a questions selector 1032, and a tutorial selector 1036.

Figure 11:
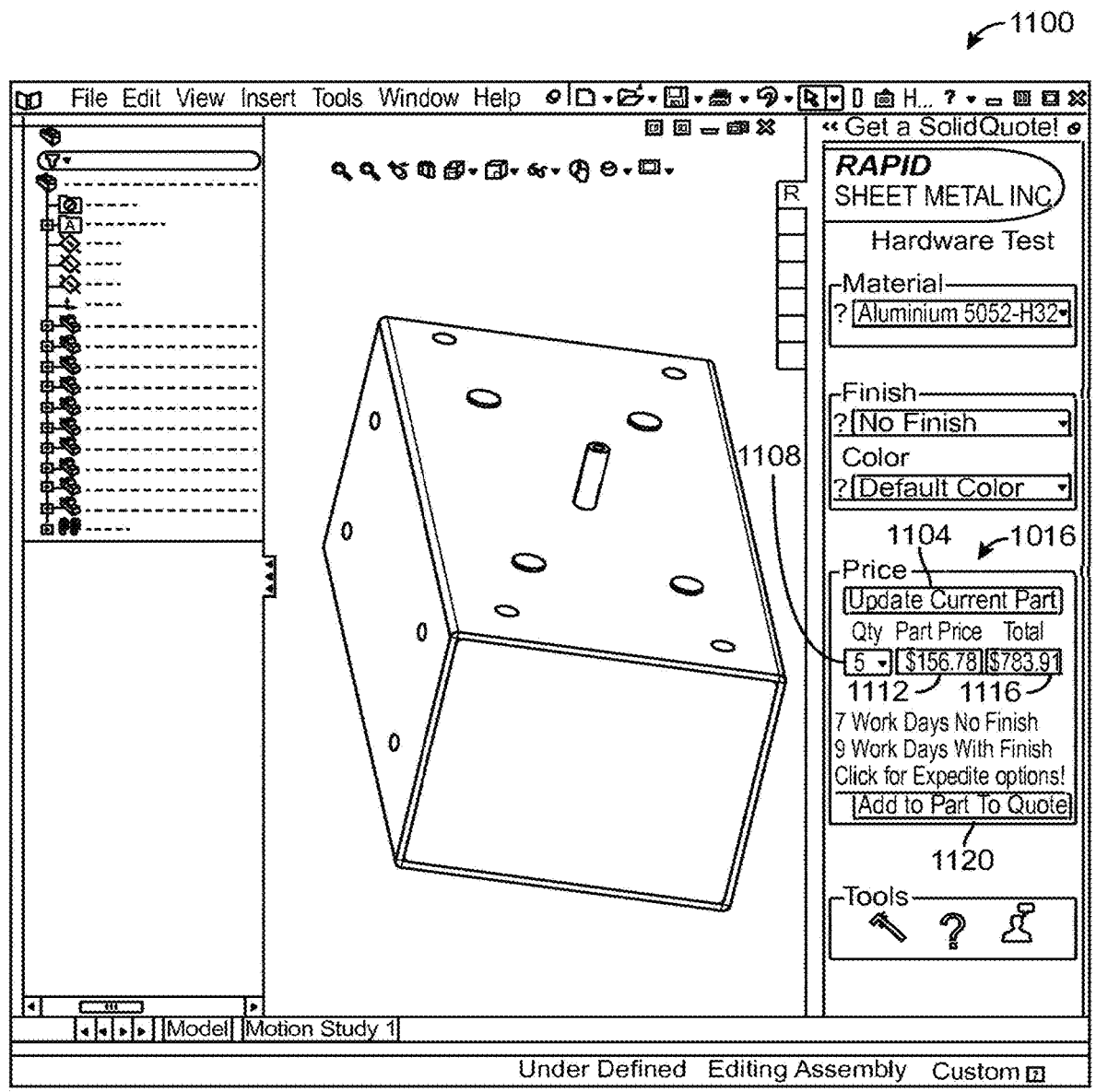
FIG. 11 is a screenshot of a display window of a particular instantiation of the fabrication-price-quoting- and ordering-system of FIG. 3, after selection of the Initiate Quote button.

FIG. 11 is an exemplary display window 1100 of computer-modeling software 308 (FIG. 3) and add-on price-quoting application 312 after selecting the "Initiate Quote" button 1020 of FIG. 10. As shown in FIG. 11, once the user has initiated the price quoting, Price region 1016 now includes several options, including: an Update Current Part button 1104 that allows the user to update the current part; a Qty (quantity) drop-down menu box 1108 that allows the user to select a desired quantity of parts to be quoted; a Part Price display region 1112 that displays the calculated price per part; and a Total display region 1116 that displays the calculated total price for all of the parts. As shown in FIG. 11, Price region 1016 includes an Add Part to Quote button 1120 that allows the user to add another part to the price-quoting process. Once the user selects Add Part To Quote button 1120, computer-modeling software 308 (FIG. 3) and add-on price-quoting application 312 direct the user to the screen display 1200 shown in FIG. 12.

Figure 12:
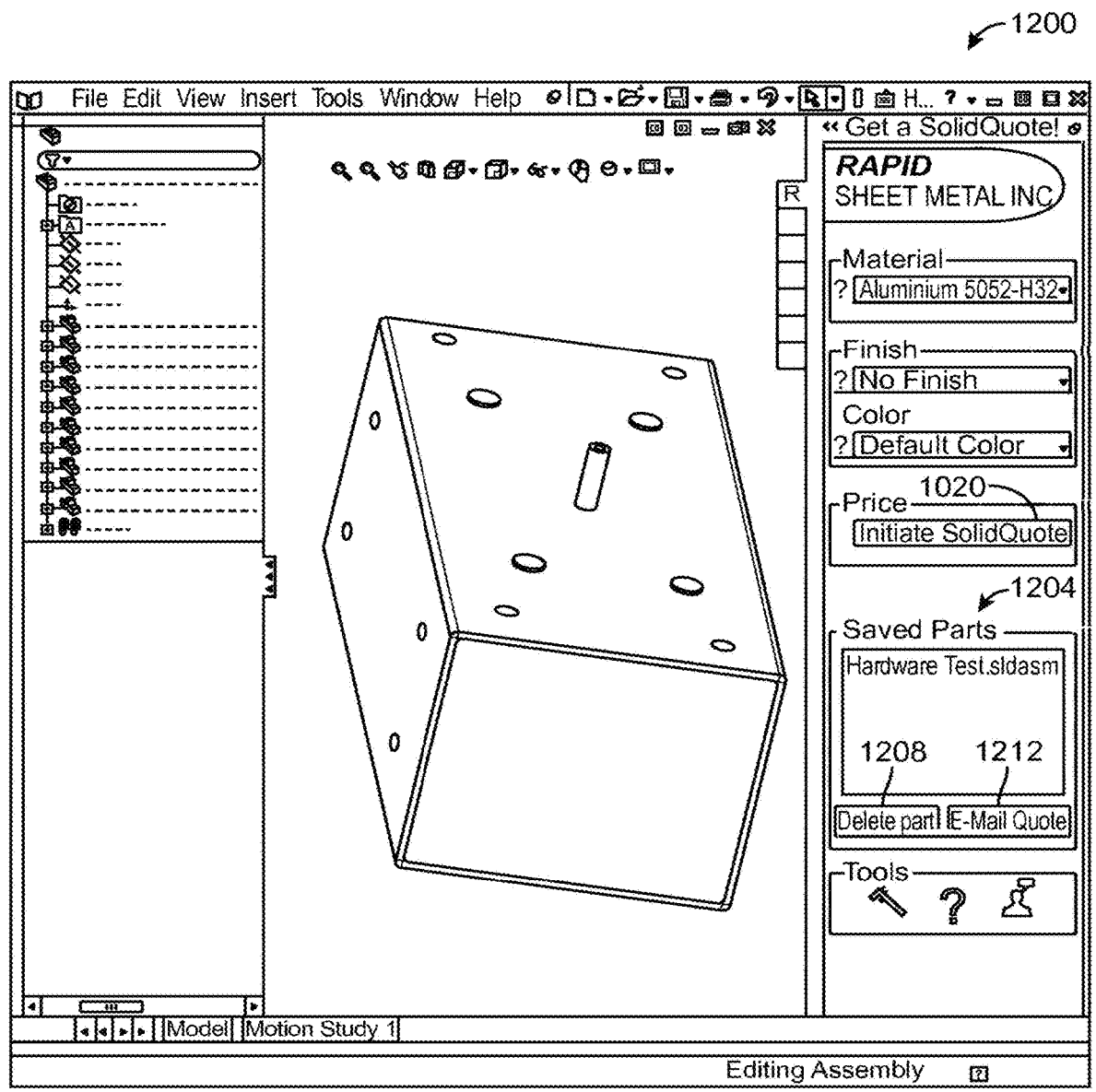
FIG. 12 is a screenshot of a display window of a particular instantiation of the fabrication-price-quoting- and ordering-system of FIG. 3, after the selection of the Add Part To Quote button.
Figure 13:
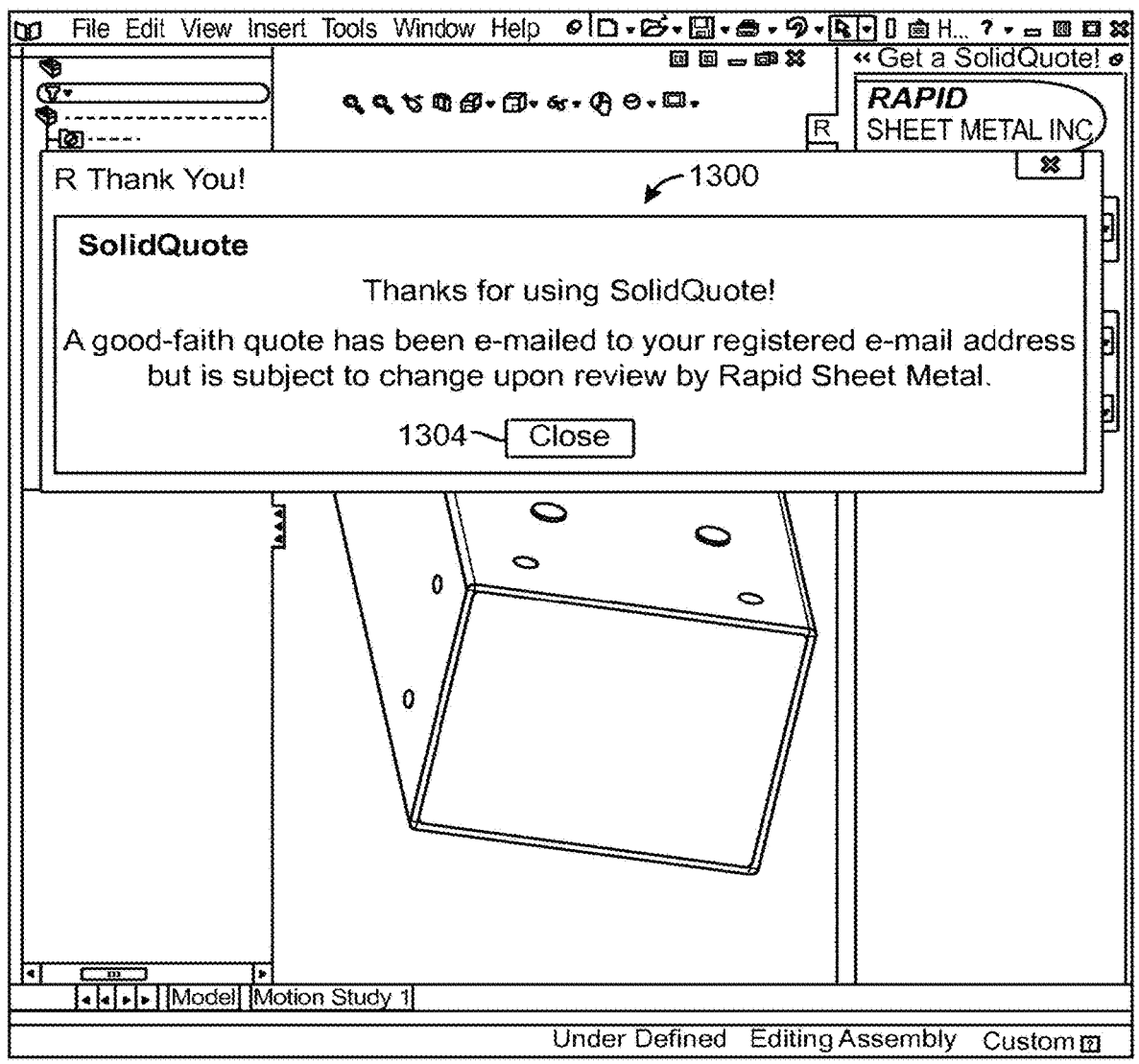
FIG. 13 is a screenshot of a popup window of a particular instantiation of the fabrication-price-quoting- and ordering-system of FIG. 3, after the selection of the E-Mail Quote button.

Screen display window 1200 of FIG. 12 includes a Saved Parts region 1204 that displays the just-added part and any previously added part(s). To initiate price quoting after saving a part, the user can select "Initiate Quote" button 1020. Window 1200 also includes a Delete Part button 1208 that a user can use to delete a part that is listed in Saved Parts region 1204. Window 1200 further includes an "E-Mail Quote" button 1212 that the user can use to email a version of the firm fabrication-price quote to the email address input into Registered-User E-Mail address field 804 of FIG. 8. In response to the user selecting E-Mail Quote button 1212, computer-modeling software 308 (FIG. 3) and add-on price-quoting application 312 present the user with a popup message window 1300, as shown in FIG. 13. Popup message window 1300 of FIG. 13 appears for the purpose of notifying the user that the quote has been emailed to the registered address using conventional e-mail handling techniques. Other messaging forms/protocols are expressly contemplated in alternate embodiments. Popup message window 1300 includes a close button 1304 that allows the user to close the message.

Figure 14:
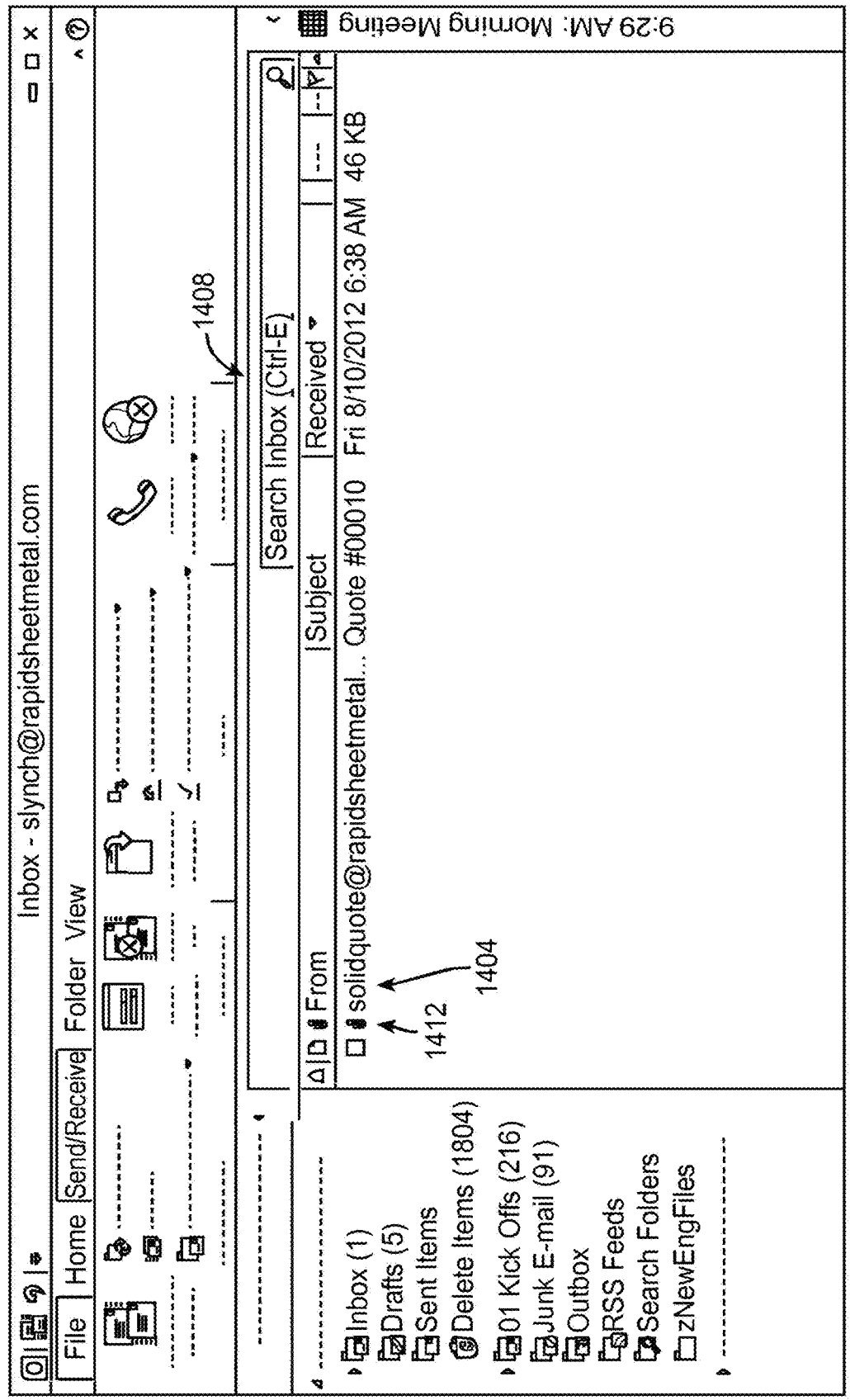
FIG. 14 is a screenshot of a display window of an email application having an inbox screen containing an email generated by the fabrication-price-quoting- and ordering-system of FIG. 3.
Figure 15:
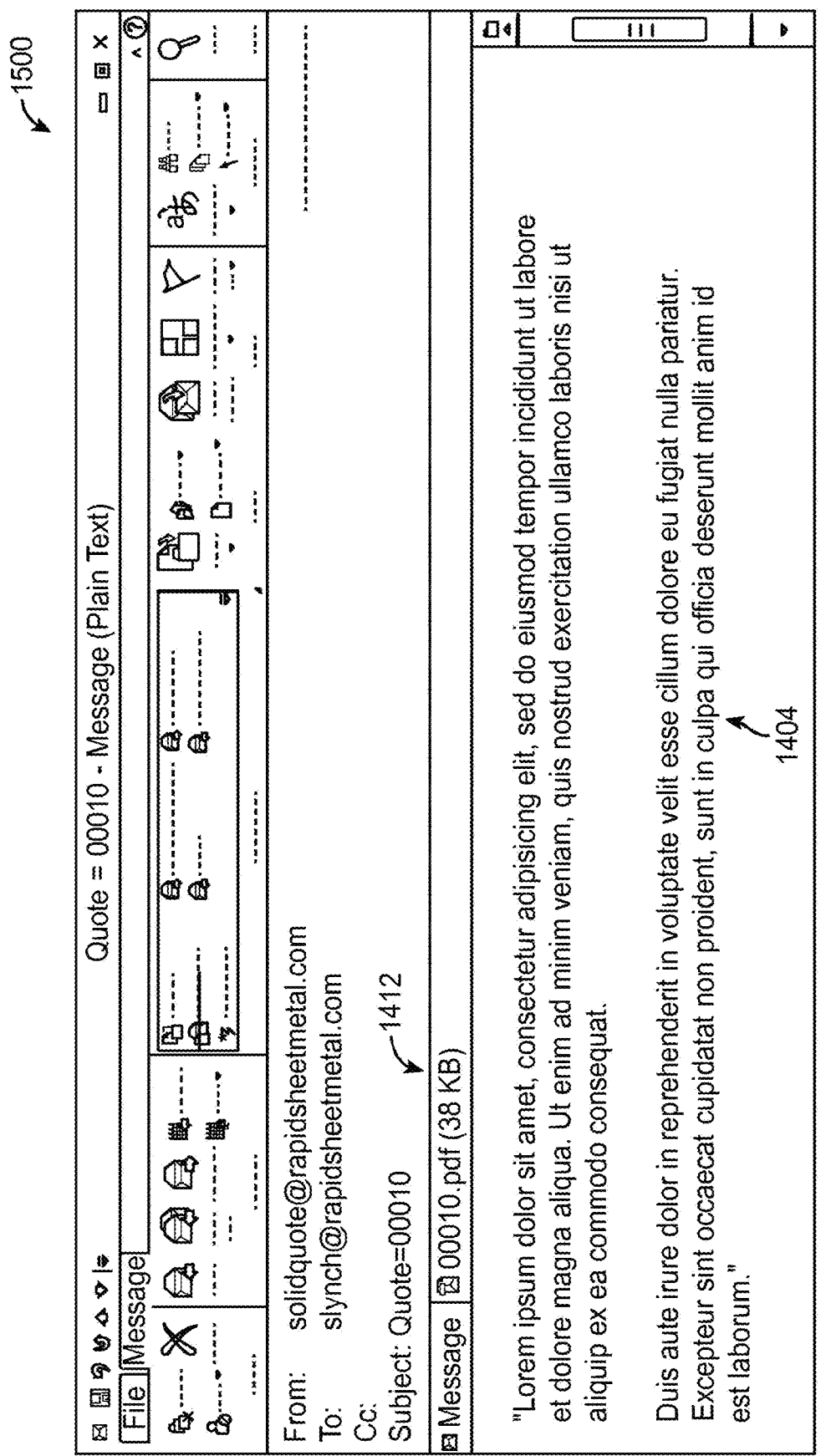
FIG. 15 is a screenshot of a display window of the email of FIG. 14.

FIG. 14 is an exemplary email application window 1400 showing an e-mail communication 1404 received in response to the user selecting E-Mail Quote button 1212 of FIG. 12. As shown, e-mail communication 1400 appears in an email inbox 1408 of the registered user, and includes a PDF attachment 1412 that contains one or more renderings and/or other pertinent information for each item included in the firm fabrication-price quote. FIG. 15 is an exemplary email window 1500 showing the content of e-mail communication 1404 of FIG. 14, along with PDF attachment 1412.

Figure 16:
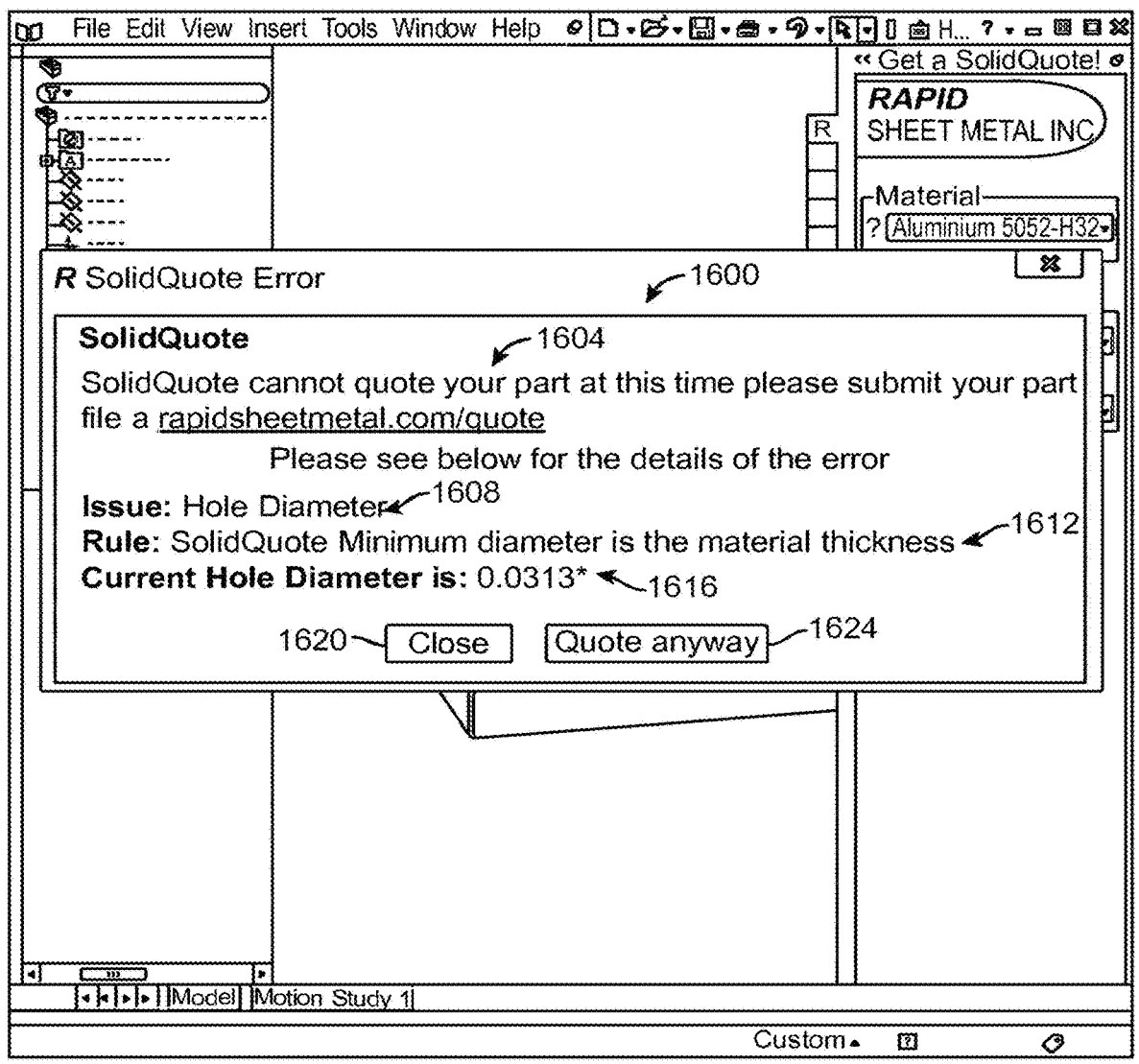
FIG. 16 is a screenshot of a popup window of a particular instantiation of the fabrication-price-quoting- and ordering-system of FIG. 3 resulting from a computer-model validation check performed by the fabrication-price-quoting- and ordering-system.

FIG. 16 illustrates an exemplary popup window 1600 that displays a warning message 1604 when a validation check performed at step 415 of FIG. 4 indicates that the items are not valid for quoting. Popup window 1600 includes an Issue region 1608 and a Rule region 1612 that set forth, respectively, the issue(s) regarding the invalidity of the current part and the rule(s) that is/are violated. In this illustrative embodiment, the issue set forth concerns the hole diameter, and the rule specifies a maximum diameter for this particular part. In this connection, popup window 1600 includes a Current Hole Diameter region 1616 that displays the current hole diameter. Depending on the rule(s) at issue, Current Hole Diameter region 1616 will be differently labeled and contain different information in association with the relevant rule(s)/issue(s). Popup window 1600 includes a Close button 1620 and a Quote anyway button 1624 that allow the user to, respectively, close the window and keep the price quotation from occurring and request that the price quotation proceed regardless of the validation issue(s) uncovered. The latter option allows the user to obtain an approximate cost for manufacturing the part even if the part cannot be verified and thus may not be able to actually be manufactured.

Web-Based Interface

Referring back to FIG. 10, tool selection region 1024 is shown as including a tutorial selector 1032. In the present example, when the user selects tutorial selector 1032, add-on price-quoting application 312 directs the user to a webpage 1700 maintained by the fabricator, as illustrated in FIG. 17. Referring to FIG. 17, webpage includes: a Download button 1704 that links the user to another webpage (not shown) that allows a user to download pertinent documents, videos, and resources; a Support button 1708 that links the user to another webpage 1800 (FIG. 18) that allows a user to access technical support; a FAQ button 1712 that links the user to another webpage (not shown) containing a listing of frequently asked questions; a Rapid Tooling button 1716 that links the user to another webpage (not shown) containing information regarding rapid tooling; a Supported Finishes button 1720 that links the user to another webpage (not shown) containing information and resources regarding the types of finishes that are supported for particular materials by that fabricator; and a Converting to Sheet Metal button 1724 that links the user to another webpage (not shown) that provides information and resources for converting prototypes and other parts to sheet metal.

Figure 18:
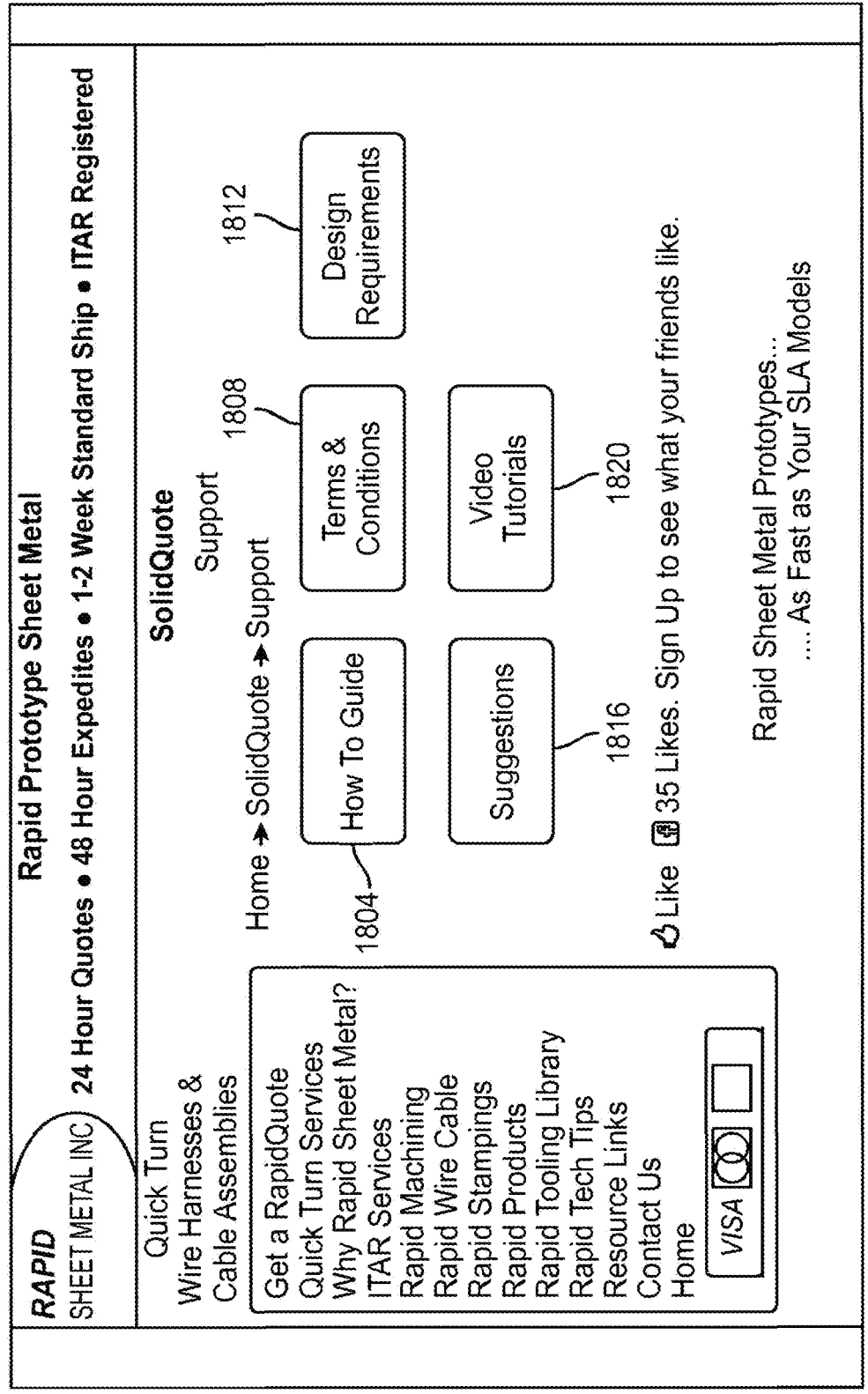
FIG. 18 is a screenshot of another webpage of the website of FIG. 17.

As noted above, when the user selects Support button 1708, webpage 1700 directs the user to webpage 1800 of FIG. 18. In this example, webpage 1800 includes: a How-to Guide button 1804 that links the user to another webpage (not shown) containing instructions for using price-quoting system 300 (FIG. 3); a Terms & Conditions button 1808 that links the user to another webpage (not shown) that provides the legal terms and conditions for the use of the price-quoting system and its various resources; a Design Requirements button 1812 that links the user to another webpage (not shown) that describes various requirements for having a part fabricated; a Suggestions button 1816 that links the user to another webpage (not shown) that allows the user to provide suggestions concerning the price-quoting system; and a Video Tutorials button 1820, that links the user to another webpage (not shown) that contains or otherwise provides access to a collection of various video files for teaching users how to perform certain functions. The web-based interface provides users with additional learning tools and support resources. The arrangement and style of functions is highly variable within ordinary skill.

Customer Portal

Reference is now made to FIGS. 19-22, which show various screen display windows of an exemplary embodiment of customer portal 328 (FIG. 3). FIG. 19 shows an exemplary log-in window 1900 of customer portal 328 of FIG. 3. Log-in window 1900 includes: a User Name input field 1904 that allows the user to enter a user name; a Password input field 1908 that allows the user to input a password corresponding to the user name; and a Log in button 1912 that, upon selection by the user, along with the appropriate user name and password, logs the user into customer portal 328 (FIG. 3). Once the user logs into customer portal 328, they are directed to a home-screen window 2000, as shown in FIG. 20. In this example, home-screen window 2000 displays, among other things, any existing firm fabrication-price quotes for which an order has not yet been placed. Such price quotes are also known as "open quotes." In FIG. 20, this particular customer has two fabrication-price quotes: quote 2004 and quote 2008, which are listed by quote date and include a total price for each. This format and presentation allows the user to view all of their open quotes and the total price for each.

Figure 21:
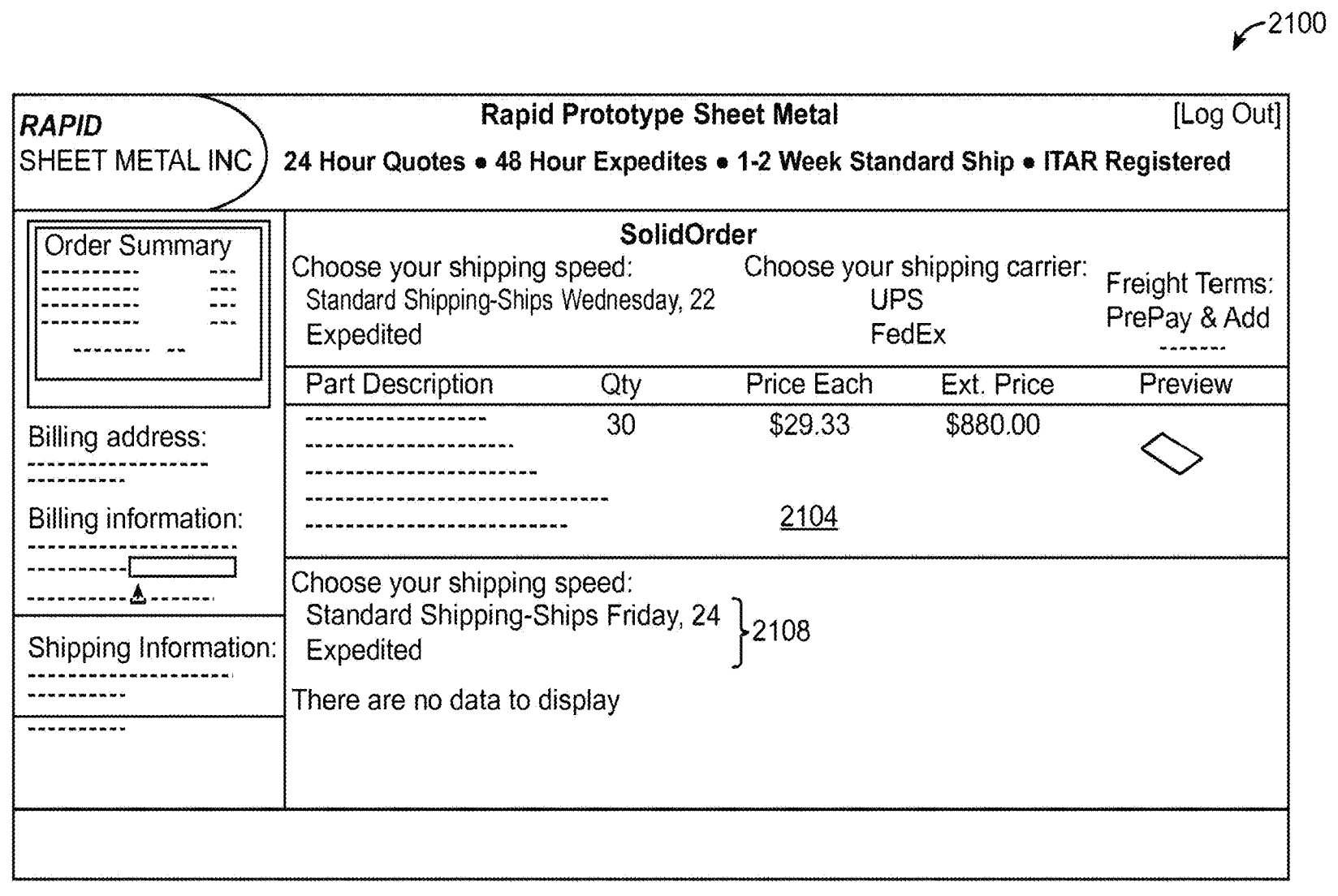

After selecting a price quote displayed in window 2000, in this instance price quote 2008, customer portal 328 directs the user to an ordering window 2100, as shown in FIG. 21, which shows details of quote 2008 in a quotation detail region 2104, as well as shipping options in a shipping option region 2108. FIG. 22 illustrates a second shipping option region 2200 that allows a user to change the shipping date, which, as seen, can affect the price accordingly.

Assemblies

Notably, a price-quoting system of the present disclosure can be readily adapted for quoting firm fabrication prices of assemblies. In some embodiments, such a price quoting system has the ability to combine pricing from custom designed parts and purchased components, as well as other aspects that are not readily quotable by conventional firm fabrication price quoting applications given their strict applicability to generate pricing only from custom designed parts residing within their computer-modeling software.

An assembly consists of two or more parts, or two or more instances of a part, and/or assemblies that are linked together within the CAD modeling system to form a virtual structure. A part can be one solid body or a collection of solid bodies. An assembly may consist of multiple levels of subassemblies which at some point consist of parts. Parts may include custom manufactured items designed by the user, and/or custom manufactured item models imported into the assembly, and/or existing purchased part components modeled by the user, and/or existing purchased part components imported into the assembly. "Purchased part components" structures may be parts that are already designed by a third party and can be readily purchased for example from a catalog or website. In any case, the collection of two or more parts and/or assemblies constitutes an assembly.

In a typical conventional computer-modeling software application, each part is designated its own part file and each assembly is designated its own assembly. For example, in the common SOLIDWORKS® CAD modeling software, virtual representations of parts are stored as .SLDPRT files and virtual representations of assemblies are stored as .SLDASM files, and in the common PTC CREO® CAD modeling software (available from PTC, Inc., Needham, Mass.), virtual representations of parts are stored as .PRT files and virtual representations of assemblies are stored as .ASM files. Generally, an assembly file groups part files together so that a user can arrange, copy, mirror, and pattern parts files to display a virtual representation of a structure. An assembly file can also arrange, copy, mirror, and pattern other assembly files as well. These other assembly files can be said to contain sub-assemblies, but the corresponding files use the same assembly file format. An assembly file, dependent upon the specific computer modeling system, may not contain the subcomponent part(s) and/or assembly(ies) but rather one or more pointers that link to the file(s) containing the constituent part(s) and/or assembly(ies).

An example of an assembly is a box having a base and a lid where the base is connected to the lid by a set of hinges that are fastened to the base and lid through fastening hardware, specifically in the example threaded studs and threaded nuts. The base and lid are custom manufactured parts designed by the user in the CAD modeling software, the stud and the nuts are parts that are purchase components from a third party manufacturer, such as Penn Engineering, Danboro, Pa., and the hinge is an assembly that is purchased from a third party distributor such as McMaster-Carr, Robbinsville, N.J. The hinge assembly consists of the two hinge sides and the pin, all of which are parts. The stud, nut and hinge models are imported CAD models located on the manufacturer and distributor websites. In the SOLIDWORKS® CAD modeling system, the assembly would be contained in an upper level assembly .SLDASM file consisting of individual .SLDPRT files for the base, lid, stud and nut, as well as a .SLDASM file for the hinge. In this example, the hinge assembly, virtually represented in the .SLDASM file as just mentioned, would consist of the right hinge part, left hinge part and pin, each virtually represented in its own .SLDPRT file. Regarding the costs associated with purchased parts/assemblies, here the threaded studs, nuts, and hinge assembly, these costs can be obtained in a variety of ways. For example, the cost for each part can be stored in the corresponding part file in a suitable manner, such as a designated cost item or as a text entry, depending on the format of the file. In some instances, costs for assemblies can be handled on a part-by-part basis in a similar manner, perhaps with a time-based cost of assembly being stored elsewhere, such as in an assembly file for the assembly. As another example, the cost(s) (e.g., total, including time-based assembly cost, or costs broken out individually for parts and assembly time), may be stored only in the assembly file. Those skilled in the art will readily appreciate that there are a variety of ways of handling the full costs (i.e., prices) of purchased parts/assemblies.

In conventional price quoting, if an assembly includes purchased component parts, a user must manually gather the pricing from catalogs, websites or other pricing documentation unassociated with the CAD modeling system in order to include those prices in the sum price of the assembly. In addition, conventional CAD software does not account for costs associated with creating the assembly, for example, in the hinge scenario noted above, the time-based cost to thread fasteners together to fasten the right hinge part to the base and the left hinge part to the lid, as well as the cost associated with the time to insert the pin to join the left hinge part and right hinge part.

Figure 23:
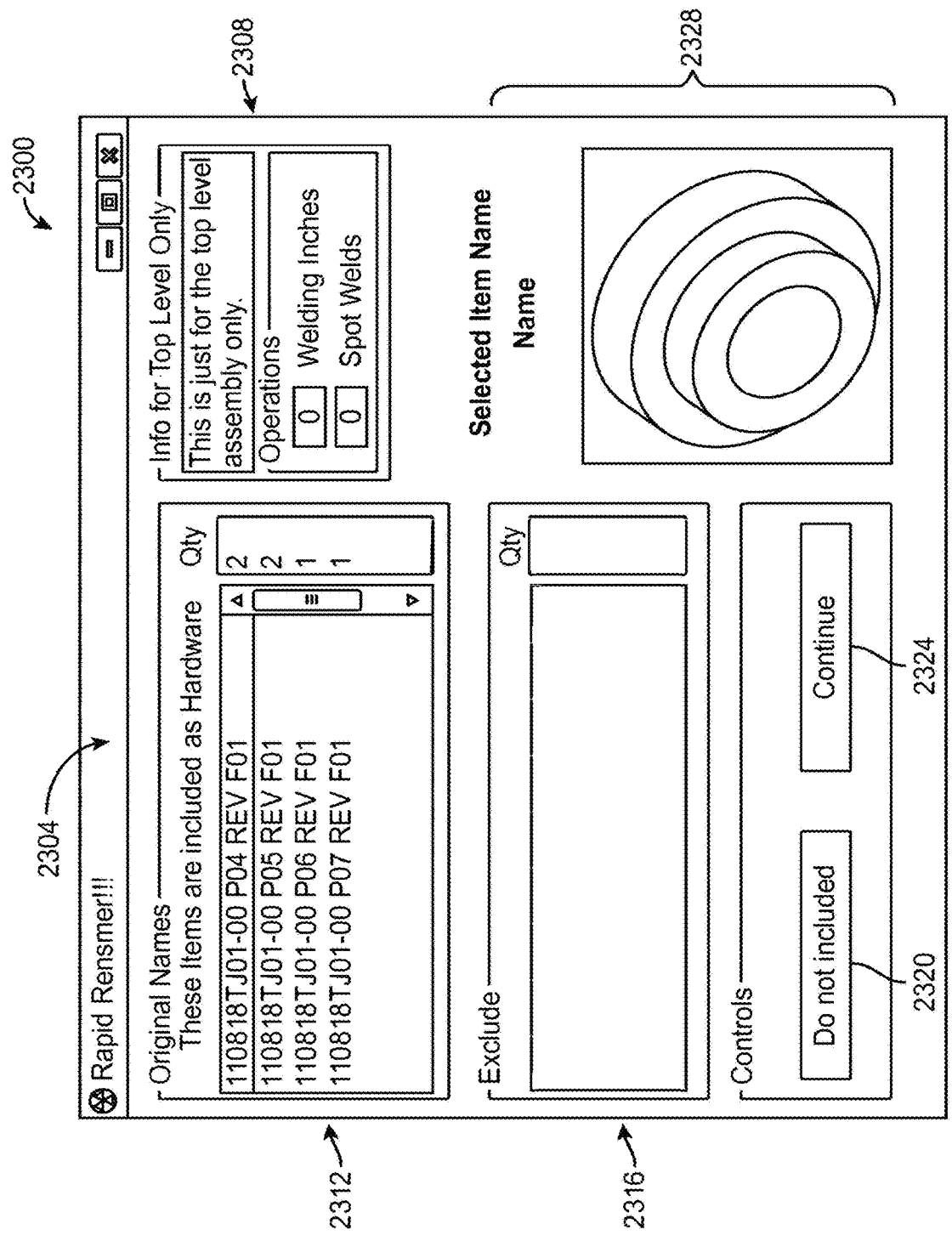
FIG. 23 is a screenshot of a display window of an assembly dashboard review and summary interface of the present disclosure.

In contrast, methodologies of the present disclosure can be implemented on assemblies with such thoroughness as to allow for a price-quoting system of the present disclosure to generate a firm fabrication-price quote for fabricating one or more instantiations of an entire assembly, including accounting for prices associated with fabricating the assembly beyond prices associated with the individual components with limited or no interaction required from the user. For example, FIG. 23 shows an exemplary display window 2300 of an assembly dashboard review and summary interface 2304. The price-quoting system displays window 2300 to the user after an assembly is compiled, but before a final firm fabrication-price quote is displayed. Window 2300 provides the user with the option to add features, such as fastening requirements, relating to the overall assembly, rather than to the individual parts. As those skilled in the art will readily appreciate, the price-quoting system, which may be the same as or similar to price-quoting system 100 of FIG. 1 and/or system 300 of FIG. 3, then uses these additional features as part of the determination of price parameters (see, e.g., price parameters 132 of FIG. 1 and corresponding description) from the actual fabrication resource requirements (see., e.g., actual fabrication resource requirements 130 of FIG. 1 and corresponding description) needed to implement those features during fabrication.

In the example shown, interface 2304 includes an assembly-level welding pane 2308 in which the user can specify parameter for welding, here inches of welding or the number of spot welds. Interface 2304 also includes a components pane 2312, which initially lists all components associated with the assembly, and a component-exclusion pane 2316, which lists any components that the user has elected to leave out of the calculations for the firm fabrication-price quote if for example that component has already been purchased. In this example, a user can exclude a component from the quoting process by highlighting the desired component and selecting an appropriate soft control, here, a "Do not include" soft button 2320. Of course, in other embodiments, the exclusion can occur in other manners, such as by dragging and dropping operations. Once the user has made the desired exclusions and has entered any other information pertinent to the price-quoting process (such as by providing welding information in pane 2308), the user can select a "Continue" button 2324 or other control to signal the price-quoting system to move on to another phase of the price-quoting process, such as finish selection, material selection, etc. for each of the parts of the assembly or to the firm fabrication-price quote generation. In one example, the price-quoting system may search for each component in the assembly and sort the components into groups. In addition, dashboard review and summary interface 2304 may allow the user to add purchased components (such as hinges) by providing appropriate information, such vendor name, part number, lead-time and price. Additionally, interface 2304 may allow the user to perform a search to determine availability and price through requests over a network such as the Internet to provide accurate and up-to-date quotes from different hinge manufacturers and/or distributors and then associate that information, most importantly the pricing information, with that component so that it can be automatically summed into the assembly price. In the embodiment shown, interface 2304 also includes a selected-component-information pane 2328 that displays a rendering of the component selected in components pane 2312 as well as the name of the selected component.

Providing firm fabrication-price quotes to a user based on computer models in an automated manner in response to user input using, for example, system 300 of FIG. 3, allows the user to quickly learn the firm fabrication-price quote of a particular instantiation (or part), both for each part or assembly individually and for the total quantity. There are several advantages of the price-quoting applications shown and described herein that will be readily apparent to those having ordinary skill in the art. Additionally, although the price-quoting systems, methods, and software have been particularly shown and described with reference to sheet metal part fabrication, it should be apparent that the systems, methods, and software are readily applicable to a wide variety of applications, including machining, production, molding, casting, wire harness, extruding, drawing, assembly of components, and other fields in which it is beneficial for obtaining pre-fabrication-price quotes.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, specific arrangements and configurations of the various exemplary display windows have been shown for illustrative purposes. However, the layout, style and arrangement of the display windows is highly variable within ordinary skill. Additionally, although the methods herein have been illustrated as being performed in a specific order, the ordering is highly variable within ordinary skill to achieve the quoting methods, systems, and software described herein. Accordingly, this description is meant to be taken only by way of example, and not to otherwise limit the scope of this invention.

In an embodiment, the method further comprises receiving, at the computer-modeling software running on the user computer, the computer model, wherein the computer model is a two-dimensional geometric model. As described herein, a "two-dimensional geometric model" is a two dimensional figure aligned on any plane. The two-dimensional geometric model can be saved in a computer file using any suitable file protocol. For example and without limitation, a suitable file protocol may include, .csv, .doc, docx, .dot, .ics, .js, .mdb, .pdf, .pps, .ppsx, .ppt, .pptx, .rtf, .sxc, .sxi, .sxw, .txt, .xls, .xlsx, .bmp, .gif, .jpeg, .jpg, .png, .tif, .tiff, .vsd, .stp, .sldprt, .par, .asm, .prt, and the like. Further, in the embodiment, the method comprises automatedly extracting geometric tolerance data from the computer model. Automated extraction of the geometric tolerance data from the computer model may include any methodology and/or process of extraction as discussed in the entirety of this disclosure. As described herein, "geometric tolerance data" is data defining the allowable deviation of at least a feature of the computer model. For example and without limitation, geometric tolerance data may include geometric dimensioning and tolerancing (GD&T), wherein GD&T is a symbolic language used by persons of ordinary skill in the art based on standards such as, for example, ASME Y14.5M-1994 Dimensioning and Tolerancing (defining the usage and meaning of geometric tolerances and related topics), ASME Y14.41-2003 Digital Product Definition Data Practices (defining the rules for displaying of annotations on the design model), and the like. For example and without limitation, the extracted geometric tolerance data may be utilized to generate a price quote for fabrication of the computer model, consider design-for-manufacturability of the computer model, identify critical to quality features of the computer model, create part travelers of the computer model, determine the fabricated part's conformance to request, perform first article inspection, generate tolerance selections on holes, orient the part, orient the support, orient the work holding, detect intent in the fabricated part, analyze performance data, and the like.

In a further embodiment, price-quote-generating algorithm, fabrication validation algorithm, fabricatability algorithm, and/or any methods as described in this disclosure may be performed by use of one or more machine-learning processes. A machine-learning process may include an unsupervised machine learning model. The unsupervised machine-learning model may operate on the computing device and/or another server in communication with the computing device, which may include any hardware and/or software module as discussed in this closure. An "unsupervised machine-learning process", as used herein, is a process that derives inferences in datasets without regard to labels and, as a result, may be free to discover any structure, relationship, and/or correlation provided in the data. For instance, and without limitation, an unsupervised machine learning module and/or the computing device may perform an unsupervised machine learning process on a first data set, which may cluster data of first data set according to detected relationships between elements of the first data set, including without limitation correlations of elements of extracted pricing data to each other and correlations of actual fabrication resource requirements to each other. Such relations may then be combined with supervised machine learning results to add new criteria for at supervised machine-learning processes as described in more detail below. As a non-limiting, illustrative example, an unsupervised process may determine that a first extracted pricing data correlates closely with a second extracted pricing data, where the first element has been linked via supervised learning processes to a given actual fabrication resource requirement, but the second has not; for instance, the second extracted pricing data may not have been defined as an input for the supervised learning process, or may pertain to a domain outside of a domain limitation for the supervised learning process. Continuing the example a close correlation between first extracted pricing data and second extracted pricing data may indicate that the second extracted pricing data is also a good predictor for the actual fabrication resource requirement; second extracted pricing data may be included in a new supervised process to derive a relationship or may be used as a synonym or proxy for the first extracted pricing data.

The unsupervised machine-learning model may include any method of cluster analysis which outputs a hierarchy of clusters. "Cluster analysis", as used herein, includes any grouping of objects such as datasets in such a way that datasets in the same group or cluster are more similar to each other than to those in other clusters. Cluster analysis may include hard clustering and/or soft clustering. Hard clustering may include clustering where each dataset belongs to any particular cluster or not. Soft clustering may include clustering where each dataset may belong to a cluster to a certain degree such as a certain percentage of belonging to any given cluster or a likelihood of belonging to a given cluster. Hierarchical clustering may group and/or segment datasets with shared attributes to extrapolate algorithmic relationships. The unsupervised machine-learning model may include generating various algorithms that may work to find clusters that may be generated based on parameter settings such as distance functions to use, density threshold, and optimal of clusters to generate. The unsupervised machine-learning model may include models such as but not limited to connectivity models, centroid models, distribution models, density models, subspace models, group models, graph-based models, signed graph models, neural models, and the like. Further, the unsupervised machine-learning model may include agglomerative and/or divisive hierarchical clustering. Agglomerative hierarchical clustering may include a bottom-up approach whereby each observation may start in its own cluster, and pairs of clusters may be merged as one moves up the hierarchy. Divisive hierarchical clustering may include a top-down approach whereby all observations may start in one cluster and splits may be performed recursively moving down the hierarchy.

The machine-learning process may include a supervised machine-learning model. The supervised machine-learning model may include, without limitation, models developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

The supervised machine-learning algorithms may include without limitation, linear discriminant analysis. The supervised machine-learning algorithm may include quadratic discriminate analysis, kernel ridge regression, and/or support vector machines, including without limitation support vector classification-based regression processes. Supervised machine-learning algorithms may include stochastic gradient descent algorithms, including classification and regression algorithms based on stochastic gradient descent. Supervised machine-learning algorithms may include nearest neighbors' algorithms, Gaussian processes, such as Gaussian Process Regression, cross-decomposition algorithms, including partial least squares and/or canonical correlation analysis, and/or naïve Bayes methods. Supervised machine-learning algorithms may include algorithms based on decision trees, such as decision tree classification or regression algorithms. Supervised machine-learning algorithms may include ensemble methods such as bagging meta-estimator, forest of randomized tress, AdaBoost, gradient tree boosting, and/or voting classifier methods. Supervised machine-learning algorithms may include neural net algorithms, including convolutional neural net processes.

The supervised machine-learning algorithms may include using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using any training set as described herein; the trained network may then be used to apply detected relationships between elements of user input datums and antidotes.

With continuing reference to FIG. 1, training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, extracted pricing data, non-extracted pricing data, and/or any other data associated with the computer model may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms.

Exemplary Computing Device

As noted above aspects and embodiments described herein may be conveniently implemented using one or more machines (e.g., one or more computing devices/computer systems that are part of a fabrication price-quoting and/or ordering system, such as system 100 of FIG. 1 and system 300 of FIG. 3) including hardware and special programming according to the teachings of the present specification, as will be apparent to those of ordinary skill in the computer arts. Appropriate software coding can readily be prepared by skilled programmers based on the teachings of the present disclosure, as will be apparent to those of ordinary skill in the software arts.

Such software may be, for example, a computer program product that employs one or more a machine-readable hardware storage mediums. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable hardware storage medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium does not include a signal.

Such software may also include information (e.g., data) carried as a data signal on a data carrier, such as a carrier wave. Such a data signal or carrier wave would not be considered a machine-readable hardware storage medium. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein. Examples of a computing device include, but are not limited to, a computer workstation, a terminal computer, a server computer, a handheld device (e.g., tablet computer, a personal digital assistant "PDA", a mobile telephone, etc.), a web appliance, a network router, a network switch, a network bridge, any machine capable of executing a sequence of instructions that specify an action to be taken by that machine, and any combinations thereof.

Figure 24:
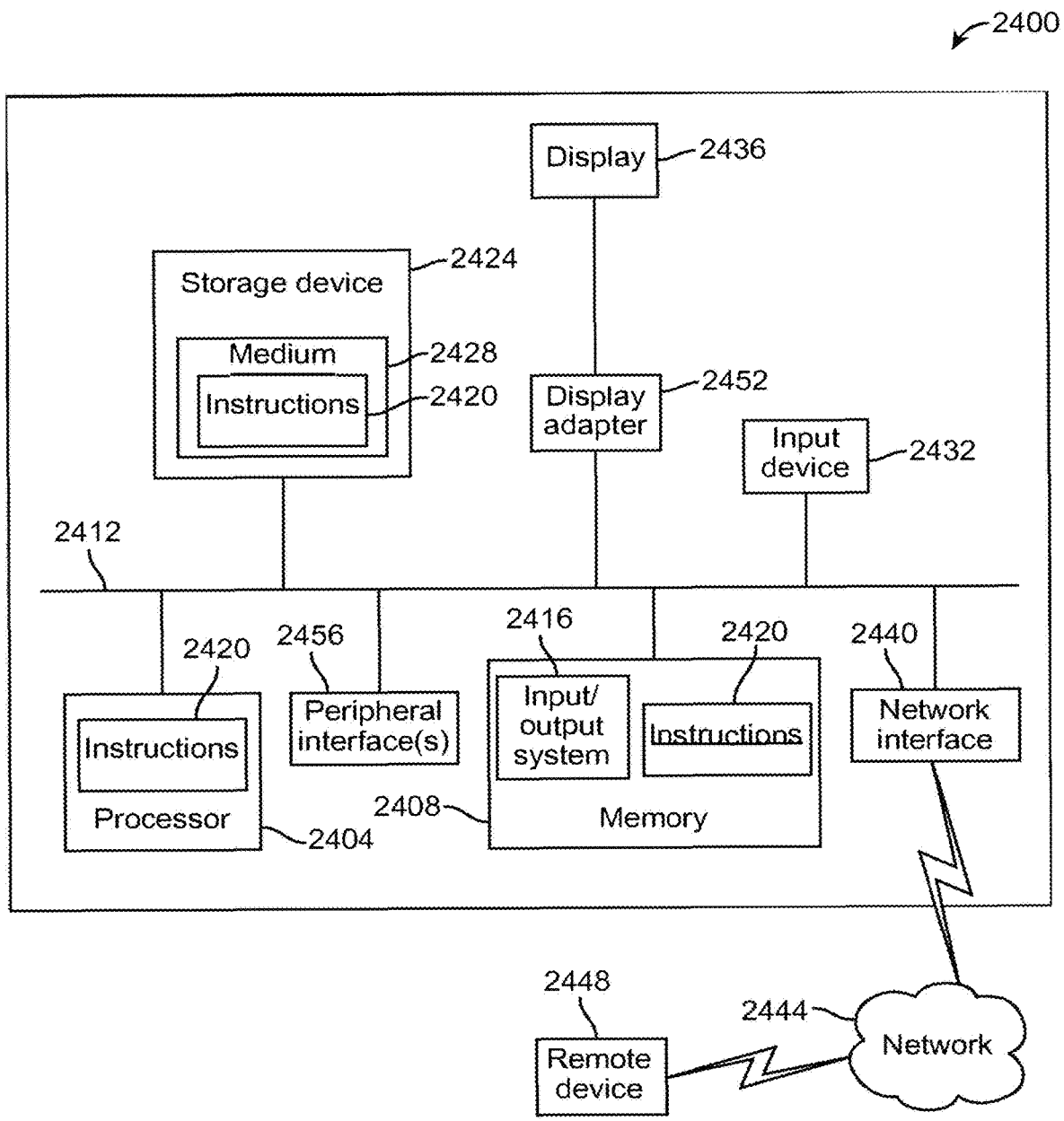
FIG. 24 is a high-level schematic diagram of a computing device that can be used as any one of the computing devices described herein.

FIG. 24 shows a diagrammatic representation of one exemplary embodiment of a computing device 2400, within which a set of instructions for causing one or more processors 2404 to perform any one or more of the functionalities, aspects, and/or methodologies of the present disclosure. It is also contemplated that multiple computing systems may be utilized to implement a specially configured set of instructions for performing any one or more of the functionalities, aspects, and/or methodologies of the present disclosure in a distributed computing matter.

Computing device 2400 can also include a memory 2408 that communicates with the one or more processors 2404, and with other components, for example, via a bus 2412. Bus 2412 may include any of several types of bus structures including, but not limited to, a memory bus, a memory controller, a peripheral bus, a local bus, and any combinations thereof, using any of a variety of bus architectures. Memory 2408 may include various components (e.g., machine-readable hardware storage media) including, but not limited to, a random access memory component (e.g., a static RAM "SRAM", a dynamic RAM "DRAM", etc.), a read only component, and any combinations thereof. In one example, a basic input/output system 2416 (BIOS), including basic routines that help to transfer information between elements within computing system 2400, such as during start-up, may be stored in memory 2408. Memory 2408 may also include (e.g., stored on one or more machine-readable hardware storage media) instructions (e.g., software) 2420 embodying any one or more of the aspects and/or methodologies of the present disclosure. In another example, memory 2408 may further include any number of program modules including, but not limited to, an operating system, one or more application programs, other program modules, program data, and any combinations thereof.

Computing device 2400 may also include a storage device 2424, such as, but not limited to, the machine readable hardware storage medium described above. Storage device 2424 may be connected to bus 2412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 2424 (or one or more components thereof) may be removably interfaced with computing system 2400 (e.g., via an external port connector (not shown)). Particularly, storage device 2424 and an associated machine-readable medium 2428 may provide nonvolatile and/or volatile storage of machine-readable instructions, data structures, program modules, and/or other data for computing device 2400. In one example, software instructions 2420 may reside, completely or partially, within machine-readable hardware storage medium 2428. In another example, software instructions 2420 may reside, completely or partially, within processors 2404.

Computing device 2400 may also include an input device 2432. In one example, a user of computing system 2400 may enter commands and/or other information into computing system 2400 via one or more input devices 2432. Examples of an input device 2432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touch screen, and any combinations thereof. Input device(s) 2432 may be interfaced to bus 2412 via any of a variety of interfaces (not shown) including, but not limited to, a serial interface, a parallel interface, a game port, a USB interface, a FIREWIRE interface, a direct interface to bus 2412, and any combinations thereof. Input device(s) 2432 may include a touch screen interface that may be a part of or separate from display(s) 2436, discussed further below. Input device(s) 2432 may be utilized as a user selection device for selecting one or more graphical representations in a graphical interface as described above.

A user may also input commands and/or other information to computing device 2400 via storage device 2424 (e.g., a removable disk drive, a flash drive, etc.) and/or network interface device(s) 2440. A network interface device, such as any one of network interface device(s) 2440, may be utilized for connecting computing system 2400 to one or more of a variety of networks, such as network 2444, and one or more remote devices 2448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network, a telephone network, a data network associated with a telephone/voice provider, a direct connection between two computing devices, and any combinations thereof. A network, such as network 2444, may employ a wired and/or a wireless mode of communication. In general, any network topology may be used. Information (e.g., data, software instructions 2420, etc.) may be communicated to and/or from computing system 2400 via network interface device(s) 2440.

Computing device 2400 may further include one or more video display adapter 2452 for communicating a displayable image to one or more display devices, such as display device(s) 2436. Examples of a display device include, but are not limited to, a liquid crystal display (LCD), a cathode ray tube (CRT), a plasma display, a light emitting diode (LED) display, and any combinations thereof. Display adapter(s) 2452 and display device(s) 2436 may be utilized in combination with processor(s) 2404 to provide a graphical representation of a utility resource, a location of a land parcel, and/or a location of an easement to a user. In addition to a display device, computing system 2400 may include one or more other peripheral output devices including, but not limited to, an audio speaker, a printer, and any combinations thereof. Such peripheral output devices may be connected to bus 2412 via a peripheral interface 2456. Examples of a peripheral interface include, but are not limited to, a serial port, a USB connection, a FIREWIRE connection, a THUNDERBOLT connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of providing, to a user on a user computer, a firm fabrication-price quote for fabricating one or more instantiations of a structure represented in a computer model viewable on computer-modeling software, the method being executed by a price-quoting system and comprising:
   receiving, at the computer-modeling software running on the user computer, the computer model;
   automatedly extracting, via the computer-modeling software running on the computing device in response to receiving the computer model, pricing data from the computer model so as to provide extracted pricing data;
   correlating the extracted pricing data to a set of actual fabrication resource requirements needed for fabrication;
   determining the firm fabrication-price quote as a function of the extracted pricing data and pricing parameter data;
   generating a portable document format file of the firm fabrication-price quote; and
   transmitting the portable document format file of the firm fabrication-price quote to the user on the user computer through a price-quoting system server of an external communications network.

2. A method according to claim 1, wherein said computer model is a three-dimensional computer model.

3. A method according to claim 1, wherein said computer model is a two-dimensional geometric model.

4. A method according to claim 1, further comprising obtaining the pricing parameter data via a remote server over an external data communications network.

5. A method according to claim 1, further comprising receiving a fabrication price request, wherein said obtaining the pricing parameter data is performed in response to said receiving the fabrication price request.

6. A method according to claim 1, further comprising verifying that the pricing parameter data is current pricing parameter data.

7. A method according to claim 6, further comprising receiving a fabrication price request, wherein verifying the price parameter is performed in response to said receiving the fabrication price quote.

8. A method according to claim 6, wherein verifying the pricing parameter data includes querying a remote server over an external data communications network.

9. A method according to claim 1, further comprising receiving updates to the pricing parameter data from a remote server over an external data communications network.

10. A method according to claim 1, wherein automatedly extracting pricing data includes extracting geometry data.

11. A method according to claim 1, wherein automatedly extracting pricing data includes extracting pre-fabricated part data.

12. A method according to claim 1, wherein automatedly extracting pricing data includes extracting purchased-part data.

13. A method according to claim 1, wherein automatedly extracting pricing data includes extracting geometric tolerance data.

14. A method according to claim 1, wherein said correlating includes inputting extracted pricing data into a price-quote-generating algorithm.

15. A method according to claim 14, wherein determining the firm fabrication-price quote includes executing a price-quote-generating algorithm, wherein execution of the price-quote generating algorithm outputs the firm fabrication-price quote.

16. A method according to claim 1, wherein the structure is represented as an assembly in an assembly file having a plurality of associated parts files, and said extracting pricing data includes extracting pricing data from at least subset of the associated parts files.

17. A method according to claim 16, further comprising allowing a selective inclusion or exclusion of at least a portion of the plurality of associated parts files being included in the fabrication price quote.

18. A method according to claim 1, further comprising performing, by the price-quoting software, a fabricatability analysis on the extracted pricing data.

19. A method according to claim 1, wherein correlating includes performing, by the price-quoting system, a fabrication validation of virtual features of the computer model.

* * * * *